US006739293B2

(12) United States Patent
Turner et al.

(10) Patent No.: US 6,739,293 B2
(45) Date of Patent: May 25, 2004

(54) HYDRAULIC VALVE ACTUATION SYSTEMS AND METHODS

(75) Inventors: Christopher Wayne Turner, Fort Collins, CO (US); Miguel Angelo Raimao, Manitou Springs, CO (US); Guy Robert Babbitt, Colorado Springs, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 0 days.

(21) Appl. No.: 10/164,046

(22) Filed: Jun. 5, 2002

(65) Prior Publication Data

US 2003/0015155 A1 Jan. 23, 2003

Related U.S. Application Data

(63) Continuation-in-part of application No. 09/729,487, filed on Dec. 4, 2000, now abandoned.

(51) Int. Cl.[7] .................................................. F01L 9/02
(52) U.S. Cl. .................................. 123/90.12; 123/90.11; 123/90.15; 123/90.13; 251/29; 251/30.01; 251/129.03; 251/129.15; 137/625.64; 137/625.65
(58) Field of Search .......................... 123/90.11, 90.12, 123/90.13, 90.15, 90.22; 251/29, 30.01, 129.03, 129.15; 137/1, 625.34, 625.39, 625.64, 625.65; 91/459, 461, 529

(56) References Cited

U.S. PATENT DOCUMENTS 3,209,737 A   10/1965   Omotehara et al. ............ 123/90
3,727,595 A   4/1973    Links ........................ 123/90.12

(List continued on next page.)

FOREIGN PATENT DOCUMENTS

CH   264710      1/1950
DE   1 292 493   4/1969
DE   2 209 206   8/1973

(List continued on next page.)

OTHER PUBLICATIONS

Pease, Dudley A., "Basic Fluid Power", 1967, pp. 136–164, Prentice–Hall, Inc., Englewood Cliffs, New Jersey.

(List continued on next page.)

Primary Examiner—Thomas Denion
Assistant Examiner—Kyle Riddle
(74) Attorney, Agent, or Firm—Blakely, Sokoloff, Taylor & Zafman LLP

(57) ABSTRACT

Hydraulic engine valve actuation systems and methods for internal combustion engines. The systems utilize a proportional valve to regulate the flow of a working fluid to and from a hydraulic actuator controlling the engine valve position. The position of the proportional valve is controlled by one or more high speed valves to control various engine valve parameters, including engine valve takeoff and landing velocities. Returning all valves to a known starting position between engine valve events avoids accumulation of errors in proportional valve positioning. Embodiments using spool valves for the high speed valves and the proportional valve, and spring return and hydraulic return for the engine valve, are disclosed. A specially shaped spool in the proportional valve provides enhanced control over the engine valve operation. Various further alternate embodiments are disclosed.

90 Claims, 13 Drawing Sheets

U.S. PATENT DOCUMENTS

| | | | |
|---|---|---|---|
| 4,009,695 A | 3/1977 | Ule | 123/90.13 |
| 4,041,983 A | 8/1977 | Bianchetta | 137/625.63 |
| 4,200,067 A | 4/1980 | Trenne | 123/90.12 |
| 4,206,728 A | 6/1980 | Trenne | 123/90.12 |
| 4,319,609 A | 3/1982 | Debrus | 137/625.63 |
| 4,648,580 A | 3/1987 | Kuwano et al. | 251/129.01 |
| 4,741,365 A | 5/1988 | Van Ornum | 137/625.65 |
| 4,791,895 A | 12/1988 | Tittizer | 123/90.12 |
| 4,870,892 A | 10/1989 | Thomsen et al. | 91/361 |
| 4,930,464 A | 6/1990 | Letsche | 123/90.12 |
| 4,945,870 A | 8/1990 | Richeson | 123/90.11 |
| 5,022,358 A | 6/1991 | Richeson | 123/90.12 |
| 5,058,857 A | 10/1991 | Hudson | 251/30.05 |
| 5,117,790 A | 6/1992 | Clarke et al. | 123/321 |
| 5,123,397 A | 6/1992 | Richeson | 123/568 |
| 5,138,838 A | 8/1992 | Crosser | 60/433 |
| 5,170,755 A | 12/1992 | Kano et al. | 123/90.17 |
| 5,193,495 A | 3/1993 | Wood, III | 123/90.12 |
| 5,193,584 A | 3/1993 | Watts | 137/625.33 |
| 5,201,296 A | 4/1993 | Wunning et al. | 123/479 |
| 5,209,453 A | 5/1993 | Aota et al. | 251/57 |
| 5,224,683 A | 7/1993 | Richeson | 251/30.01 |
| 5,231,959 A | 8/1993 | Smietana | 123/90.12 |
| 5,237,968 A | 8/1993 | Miller et al. | 123/90.11 |
| 5,237,976 A | 8/1993 | Lawrence et al. | 123/508 |
| 5,244,002 A | 9/1993 | Frederick | 137/1 |
| 5,248,123 A | 9/1993 | Richeson et al. | 251/29 |
| 5,255,641 A | 10/1993 | Schechter | 123/90.11 |
| 5,275,136 A | 1/1994 | Schechter et al. | 123/90.12 |
| 5,335,633 A | 8/1994 | Thien | 123/90.12 |
| 5,373,817 A | 12/1994 | Schechter et al. | 123/90.12 |
| 5,375,419 A | 12/1994 | Wright et al. | 60/607 |
| 5,410,994 A | 5/1995 | Schechter | 123/90.12 |
| 5,456,221 A | 10/1995 | Schechter | 123/90.12 |
| 5,456,222 A | 10/1995 | Schechter | 123/90.12 |
| 5,456,223 A | 10/1995 | Miller et al. | 123/90.12 |
| 5,507,316 A | 4/1996 | Meyer | 137/625.65 |
| RE35,303 E | 7/1996 | Miller et al. | 123/90.11 |
| 5,531,192 A | 7/1996 | Feucht et al. | 123/90.12 |
| 5,562,070 A | 10/1996 | Schechter et al. | 123/90.12 |
| 5,568,759 A | 10/1996 | Aardema | 91/461 |
| 5,572,961 A | 11/1996 | Schechter et al. | 123/90.12 |
| 5,577,468 A | 11/1996 | Weber | 123/90.12 |
| 5,595,148 A | 1/1997 | Letsche et al. | 123/90.12 |
| 5,619,965 A | 4/1997 | Cosma et al. | 123/322 |
| 5,638,781 A | 6/1997 | Sturman | 123/90.12 |
| 5,640,987 A | 6/1997 | Sturman | 137/1 |
| 5,664,477 A | 9/1997 | Koehler | 91/529 |
| 5,713,316 A | 2/1998 | Sturman | 123/90.12 |
| 5,813,226 A | 9/1998 | Krone et al. | 60/327 |
| 5,829,396 A | 11/1998 | Sturman | 123/90.12 |
| 5,881,689 A | 3/1999 | Hochholzer | 123/90.12 |
| 5,911,245 A | 6/1999 | Weber | 137/675.65 |
| 5,960,695 A | 10/1999 | Aardema et al. | 91/433 |
| 5,960,753 A | 10/1999 | Sturman | 123/90.12 |
| 5,970,956 A | 10/1999 | Sturman | 123/508 |
| 6,044,815 A | 4/2000 | de Ojeda | 123/90.12 |
| 6,067,946 A * | 5/2000 | Bunker et al. | 123/90.12 |
| 6,092,495 A | 7/2000 | Hackett | 123/90.15 |
| 6,109,284 A | 8/2000 | Johnson et al. | 137/1 |
| 6,148,778 A | 11/2000 | Sturman | 123/90.12 |
| 6,152,094 A | 11/2000 | Kirschbaum | 123/90.11 |
| 6,173,684 B1 | 1/2001 | Buehrle, II et al. | 123/90.12 |
| 6,173,685 B1 | 1/2001 | Sturman | 123/90.12 |
| 6,260,521 B1 | 7/2001 | Kirschbaum | 123/90.11 |
| 6,263,842 B1 | 7/2001 | De Ojeda et al. | 123/90.12 |
| 6,308,690 B1 | 10/2001 | Sturman | 123/508 |
| 6,321,702 B1 | 11/2001 | Diehl et al. | 123/90.12 |
| 6,321,703 B1 | 11/2001 | Diehl et al. | 123/90.12 |
| 6,338,320 B1 | 1/2002 | De Ojeda | 123/90.12 |
| 6,349,686 B1 | 2/2002 | Feucht et al. | 123/90.12 |
| 6,374,856 B1 * | 4/2002 | Nitsche | 137/625.65 |
| 6,412,457 B1 | 7/2002 | Vorih et al. | 123/90.12 |
| 6,415,749 B1 | 7/2002 | Sturman et al. | 123/70 R |
| 6,474,277 B1 | 11/2002 | Vanderpoel et al. | 123/90.12 |
| 6,474,620 B2 | 11/2002 | Cornell et al. | 25/48 |
| 2002/0121251 A1 | 9/2002 | Watson et al. | 123/90.12 |
| 2002/0179029 A1 | 12/2002 | Watson et al. | 123/90.46 |

FOREIGN PATENT DOCUMENTS

| | | | |
|---|---|---|---|
| DE | 37 27 335 A1 | 2/1988 | F02B/71/00 |
| EP | 0 184 940 A2 | 6/1986 | F02D/42/20 |
| EP | 0 331 198 A2 | 9/1989 | F02M/47/02 |
| EP | 0 550 925 A2 | 7/1993 | F01L/9/02 |
| EP | 0 695 395 B1 | 2/1996 | F01L/13/00 |
| FR | 495644 | 10/1919 | |
| GB | 349165 | 3/1930 | |
| GB | 892121 | 3/1962 | |
| GB | 941453 | 11/1963 | |
| GB | 1 465 283 | 2/1977 | |
| JP | 4-341653 | 11/1992 | F16H/61/00 |
| WO | WO92/07172 A1 | 4/1992 | F01L/9/02 |
| WO | WO96/36795 A1 | 11/1996 | F01L/9/02 |
| WO | WO98/11334 A2 | 3/1998 | |
| WO | WO00/65212 A1 | 11/2000 | F02B/75/02 |
| WO | WO02/06641 A1 | 1/2002 | F01L/9/02 |

OTHER PUBLICATIONS

Bryson, Jr., Arthur E. et al., "Applied Optimal Control", 1975, pp. 107–117, Hemisphere Publishing Corporation, Washington, D.C.

Friedland, Bernard, "Advanced Control System Design", 1996, pp. 129–161, Prentice Hall, Englewood Cliffs, New Jersey.

Schechter, Michael M., et al., "Camless Engine", SAE Technical Paper Series No. 950681, Feb. 26–29, 1996, pp. 17–31.

Anderson, Mark D., et al., "Adaptive Lift Control for a Camless Electrohydraulic Valvetrain", SAE Technical Paper Series No. 981029, Feb. 23–26, 1998, pp. 135–142.

Misovec, Kathleen M., et al., "Digital Valve Technology Applied to the Control of an Hydraulic Valve Actuator", SAE Technical Paper Series No. 1999–01–0825 Mar. 1–4, 1999, pp. 1–5.

Book, Ruth, et al., "Programmable Electrohydraulic Valve", SAE Technical Paper Series No. 1999–01–2852, Sep. 13–15, 1999, pp. 1–7.

Allen, Jeff, et al., "Production Electro–Hydraulic Variable Valve–Train for a New Generation of I.C. Engines", SAE Technical Paper Series No. 2002–01–1109, Mar. 4–7, 2002.

* cited by examiner

HYDRAULIC VALVE ACTUATION SYSTEMS AND METHODS

CROSS-REFERENCE TO RELATED APPLICATION

This application is a continuation-in-part of application Ser. No. 09/729,487, filed Dec. 4, 2000 now abandoned.

BACKGROUND OF THE INVENTION

1. Field of the Invention

The present invention relates to the field of hydraulic valve actuation adapted for internal combustion engines.

2. Prior Art

At the present time, piston-type internal combustion engines of interest to the present invention are currently widely used in automobiles, trucks, buses and various other mobile and stationary power systems. Such engines include the common gasoline and diesel engines, as well as similar engines operating from alternative fuels such as liquid propane. These engines commonly utilize intake and exhaust valves that are spring loaded to the closed position and which are directly or indirectly opened at appropriate times by a camshaft mechanically driven from the engine crankshaft. In a four-stroke engine, the camshaft is driven through a two-to-one reduction drive system (gear or chain or belt, etc.) to rotate at one-half the engine crankshaft speed.

Camshaft actuation of engine valves historically has had a number of advantages, resulting in its relatively universal use in such engines for many decades. These advantages include high reliability, particularly given the current level of development of such cam actuated valve systems. Cam actuation is also relatively cost effective, again given the state of development and quantities in which it is produced. Cam actuation also has the advantage of allowing shaping the cam to provide a smooth curve defining intake or exhaust valve position versus camshaft angle. This results in a rather low velocity takeoff and initial valve opening, as well as a rather low velocity valve final closing at low engine speeds, resulting in minimum noise being generated. It also results in faster valve opening and valve closing at higher engine speeds as required to maintain the same valve timing throughout the engine speed operating range.

Engine valve systems are facing more and more challenges that are becoming of increasing concern. In particular, optimal valve timing and lift are not fixed throughout the engine operating range. For instance, optimal valve timing and lift for maximum power at one engine speed will not be the same as optimal valve timing and lift for maximum power at another engine speed. Accordingly, the classic cam operated valve systems utilize a compromised valve timing and lift, providing compromised performance over a certain range of engine operating conditions while being less than optimal for most, if not at all, these conditions. Further, valve timing and lift for maximum power at any engine speed may not be optimal from an engine emissions standpoint. Optimum valve timing and lift at any given engine speed may need to be dependent on other dynamic engine parameters, such as one or more of engine loading, air temperature, air pressure, engine temperature, etc.

Recently, mechanisms have been introduced to attempt to make up for some of the limitations in the fixed timing and lift cam operated valve systems. These mechanisms include mechanisms for somewhat varying valve timing with engine speed, as well as mechanisms for also increasing the valve open duration. However, such mechanisms-tend to be complicated, open the valve a fixed distance under all engine operating speeds and are limited in the number and range of variables for which valve operation may begin to be optimized.

Recently, various hydraulic systems for valve actuation have been proposed. These systems offer the potential of more flexible control of valve actuation parameters over the range of the various engine operating parameters. The present invention is an improvement on these systems.

BRIEF SUMMARY OF THE INVENTION

Hydraulic engine valve actuation systems and methods for internal combustion engines are disclosed herein. The systems utilize a proportional valve to regulate the flow of a working fluid to and from a hydraulic actuator controlling the engine valve position. The position of the proportional valve is controlled by high speed valves to control various engine valve parameters, such as one or more of engine valve takeoff and landing velocities, opening and closing velocities, valve lift, and/or valve timing and/or duration. Consistently, returning all valves to a known reference or starting position between engine valve events avoids accumulation of errors in proportional valve positioning. Exemplary embodiments using spool or poppet valves for the high speed pilot valves and a spool valve for the proportional valve, and spring return and/or hydraulic return for the engine valve, are disclosed.

To provide enhanced control over the engine valve operation, a specially shaped spool in the proportional valve may be used to control the flow area versus spool position. This allows more gradual restricting of the flow area versus spool movement over selected portions of the possible spool positions, diminishing the effect of small errors in spool position in such regions without inhibiting the maximum flow areas when the spool is at its maximum working fluid delivery positions.

Various further alternate embodiments are disclosed.

DETAILED DESCRIPTION OF THE PREFERRED EMBODIMENT

The present invention is a hydraulic valve operating system and components thereof adapted for operating one or more intake valves or one or more exhaust valves in an internal combustion engine, which provides full flexibility in valve timing, valve duration, extent of opening, and valve opening and closing velocities. Operation over the desired range of these and other parameters may be controlled, and more importantly optimized, not just for one but for all engine operating conditions. Such optimization may also include adjusting (e.g., incrementally) the valve operation based on the valve operation during a previous valve operating cycle or during the present cycle. This is achieved by controlling the position of a proportional valve by the use of pilot valves to control the operating parameters of an intake or exhaust engine valve. In that regard, a reference herein and in the claims to an "intake valve" or an "exhaust valve," unless otherwise made clear by the context in which the phrase is used, shall mean one or more intake valves for a combustion chamber of an internal combustion engine, or one or more exhaust valves of a combustion chamber of an internal combustion engine. Exemplary embodiments of this system, sometimes referred to herein as a "two-stage" or multi-stage system, are hereafter described in detail.

Figure 1:
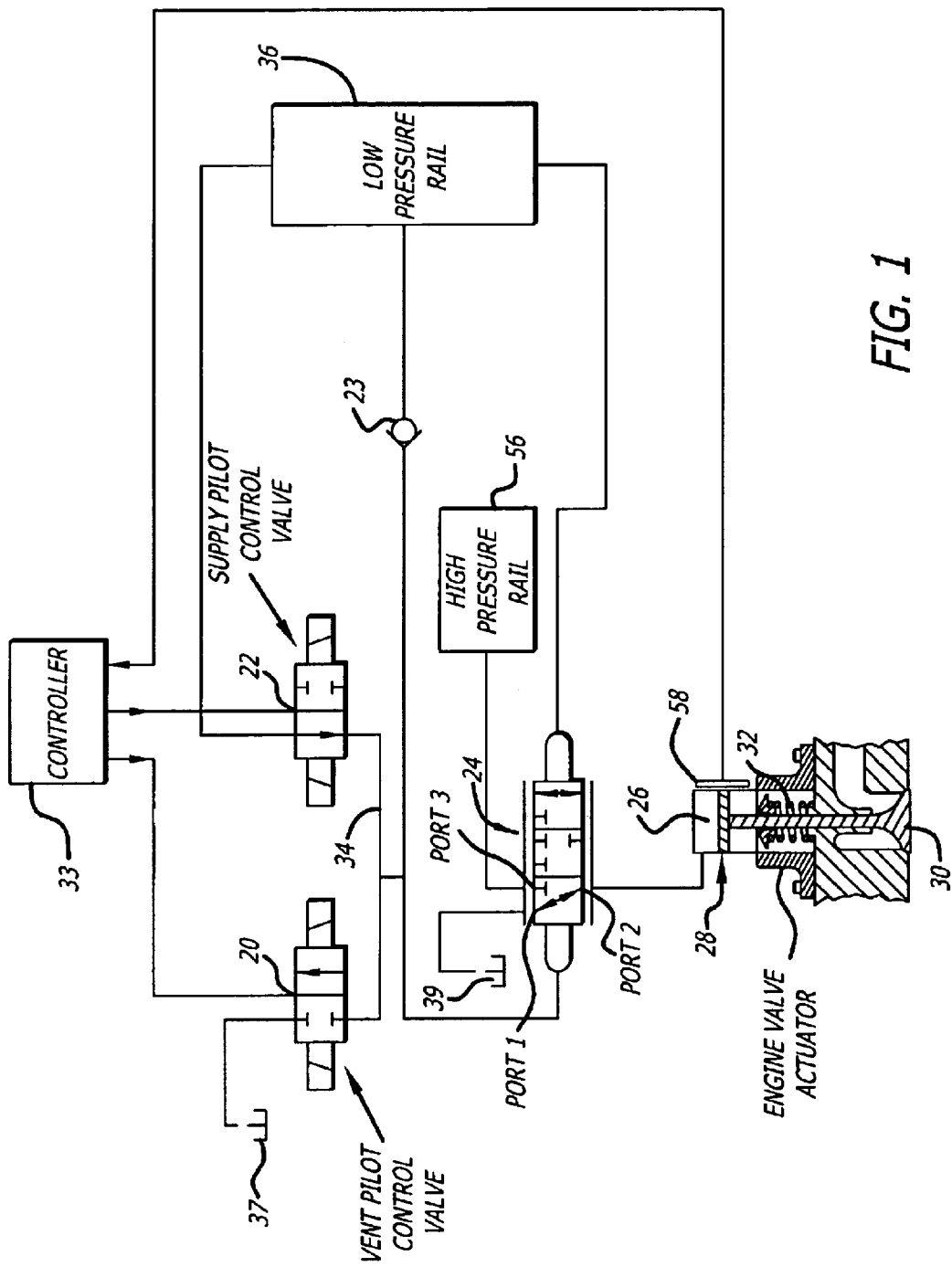
FIG. 1 is a block diagram of an exemplary configuration of a system in accordance with the present invention.

First referring to FIG. 1, a block diagram of an exemplary configuration of a system in accordance with the present invention may be seen. The system illustrated in FIG. 1 may be adapted to actuate an intake or an exhaust engine valve. This 2-stage system includes two pilot control valves 20 and 22 (such as two miniature 2-way digital latching spool valves) coupled to control the position of a 3-way proportional spool valve 24. The proportional spool valve, in turn, controls the flow area into, and out of, a control volume 26. This control volume hydraulically acts on an actuator 28 to regulate the position of the engine valve 30. In this embodiment, a mechanical return spring 32 is utilized for valve closing, though embodiments with hydraulic valve closing may also be used, as shall be subsequently described.

The two pilot control valves 20, 22 may be identical valves, for example in accordance with the 2-way valves disclosed in U.S. Pat. No. 5,640,987 entitled Digital Two, Three, and Four Way Solenoid Control Valves, issued to O. E. Sturman on Jun. 24, 1997, the disclosure of which is incorporated herein by reference. Such valves are double solenoid, high speed, magnetically latchable spool valves that as used in the present invention, are operable between two positions. The first or opened position couples a first port to a second port for enabling fluid communication between the two ports, and the second or closed position blocks fluid communication between the first and second ports. While other types of valves could be used, such as poppet valves, valves generally of the type disclosed in the above referenced patent are preferred because of their very high speed for good control, and relatively low energy consumption because of such capabilities as their magnetic latching, and the ability to determine completion of actuation, if used, to minimize heating above the already relatively warm environment in which they operate. (See U.S. Pat. No. 5,720,261 issued to Sturman, et al. on Feb. 24, 1998 and U.S. Pat. No. 5,954,030 issued to Sturman, et al. on Sep. 21, 1999.)

In the embodiment of the present invention of FIG. 1, pilot control valve 20 allows fluid flow from fluid line 34 to a drain line 35 and fluid reservoir 37 at a relatively low pressure, such as atmospheric pressure or slightly higher (about 1–5 bar or 14.5–72.5 psi typical) when in its first position, and blocks fluid flow from fluid line 34 to the drain line 35 when in its second position. The other pilot control valve 22 allows fluid flow from a low pressure rail 36 to the fluid line 34 when in its first or opened position, and blocks fluid flow from the low pressure rail 36 to the fluid line 34 when in its second or closed position. Check valve 23 is optional, and is normally closed, as the differential pressure on the check valve normally will not be in a direction to open the valve. Its presence however, will help damp transient pressure fluctuations and recover energy in the pressure fluctuations.

Figure 2:
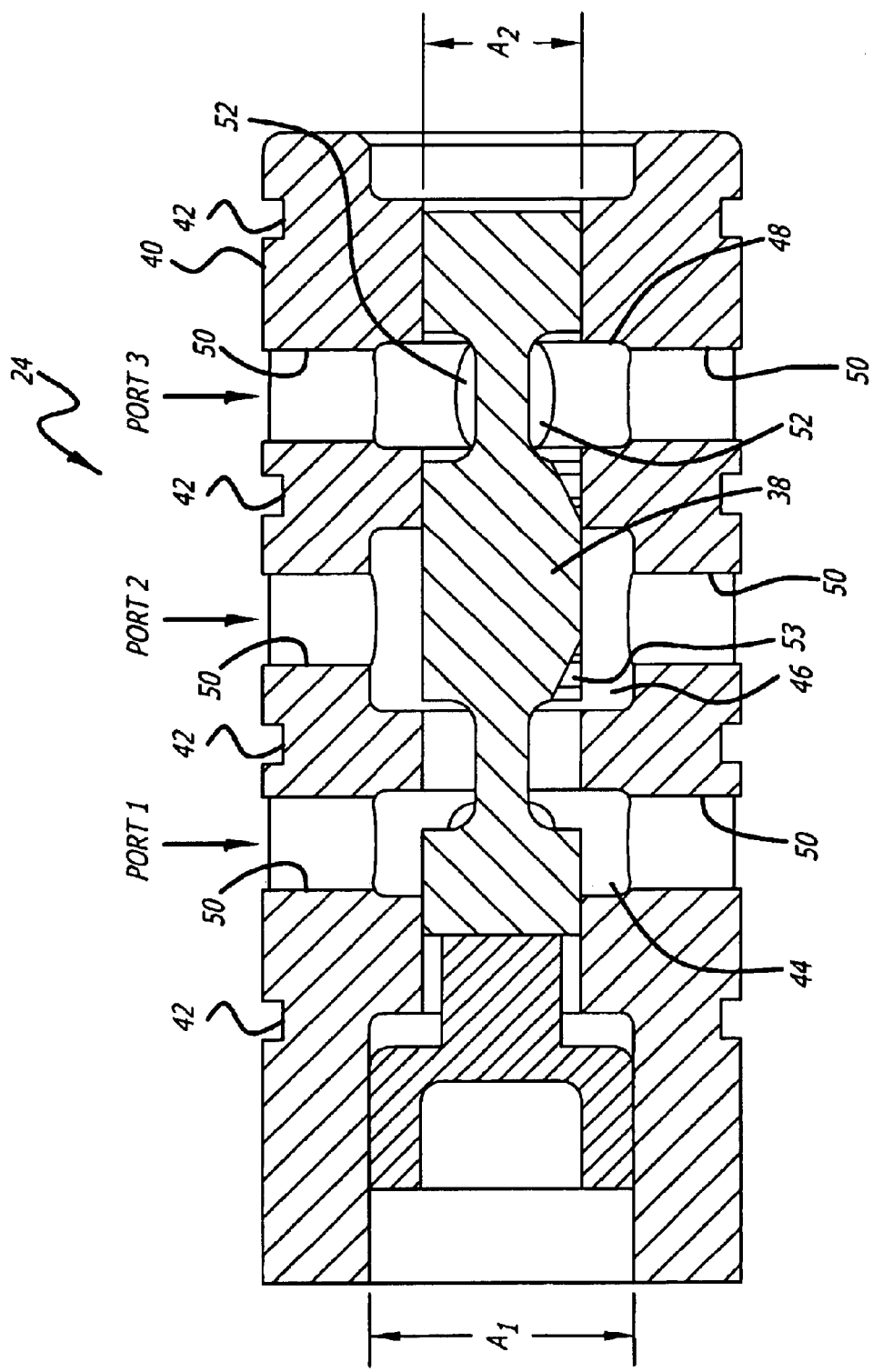
FIG. 2 is a diagram illustrating the general structure and function of the three-way proportional spool valve 24 of FIG. 1.

Now referring to FIG. 2, a diagram illustrating the general structure and function of the three-way proportional spool valve 24 of FIG. 1 may be seen. The proportional spool valve includes a spool 38 within an internal housing 40 that fits within an external housing assembly (not shown) with sealing O-rings in O-ring grooves 42 to separate the regions of ports 1, 2 and 3 from each other and from the end portions of the internal housing 40. In that regard, the outer housing assembly, in addition to having the associated fluid connections, also includes internal annular grooves adjacent each of the regions identified as drain port 1, cylinder port 2, and supply port 3 in FIG. 2, each to act as a manifold region for the holes through the internal housing 40 for fluid communication with a respective one of the inner regions 44, 46 and 48 in the internal housing 40, respectively. Fluid communication from each of the ports to the associated inner region 44, 46 or 48 is provided in the exemplary embodiment not only by through holes 50, but also by cooperatively disposed orthogonal through holes 52 associated with each of the ports. The holes 50 and 52 may be arranged radially in such a way as to minimize radial loading of the spool 38 by fluid flow forces.

As schematically illustrated in FIG. 2, the spool 38 is positioned within the internal housing 40 by opposing fluid pressures acting on a piston at the left end of the spool having an effective area $A_1$ and on the right end of the spool having an effective area of $A_2$. In a an exemplary implementation, the area $A_1$ is approximately twice the area $A_2$, though this is not a limitation of the invention. The desired area ratio may be obtained by providing a piston at either end of the spool, or both ends of the spool if needed, to also obtain the desired actuation forces.

As specifically illustrated in FIG. 2, the spool 38 is shown in its extreme right position, referred to herein as its third position or state 3 (see FIGS. 5 and 6, to be subsequently described), as defined by stops on the travel of either the pistons actuating the spool or stops acting on the spool itself. In its third position or state 3, the spool 38 is blocking fluid communication between cylinder port 2 and supply port 3 and is allowing fluid communication between drain port 1 and cylinder port 2. Moreover, when the spool 38 is at its left-most position, referred to herein as its first position or state 1, fluid communication between drain port 1 and cylinder port 2 is blocked and fluid communication between cylinder port 2 and supply port 3 is enabled. In the second spool position, (state 2) all fluid flow is blocked between drain port 1, cylinder port 2, and supply port 3.

Normally in a spool valve, by way of example in the two miniature, two-way digital latching spool valves 20 and 22 of FIG. 1, fluid communication between two adjacent ports will be blocked when the spool is in one position and during the initial motion of the spool toward the other position. However, once the relief on the spool associated with the land in the housing separating the regions coupled to the two adjacent ports starts to bridge the land, a flow area between the regions coupled to the two ports is established. For example, this flow area may increase linearly with further motion of the spool. Because that flow area is a peripheral portion of the full diameter of the spool, once opening starts, a relatively large flow area between the two ports will be opened with only a relatively small further motion of the spool.

Figure 3:
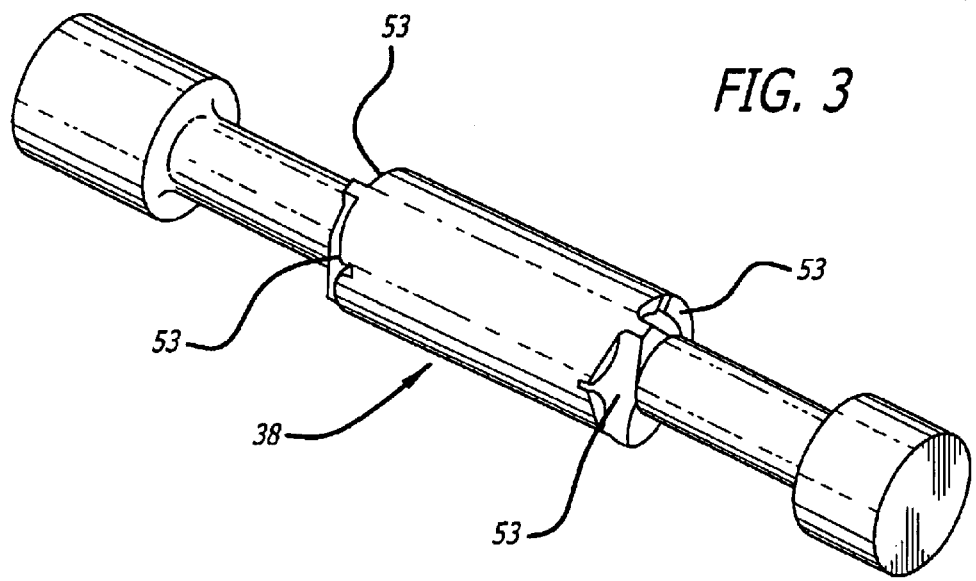
FIG. 3 is a perspective view of the spool 38 of the proportional valve of FIG. 2.
Figure 4:
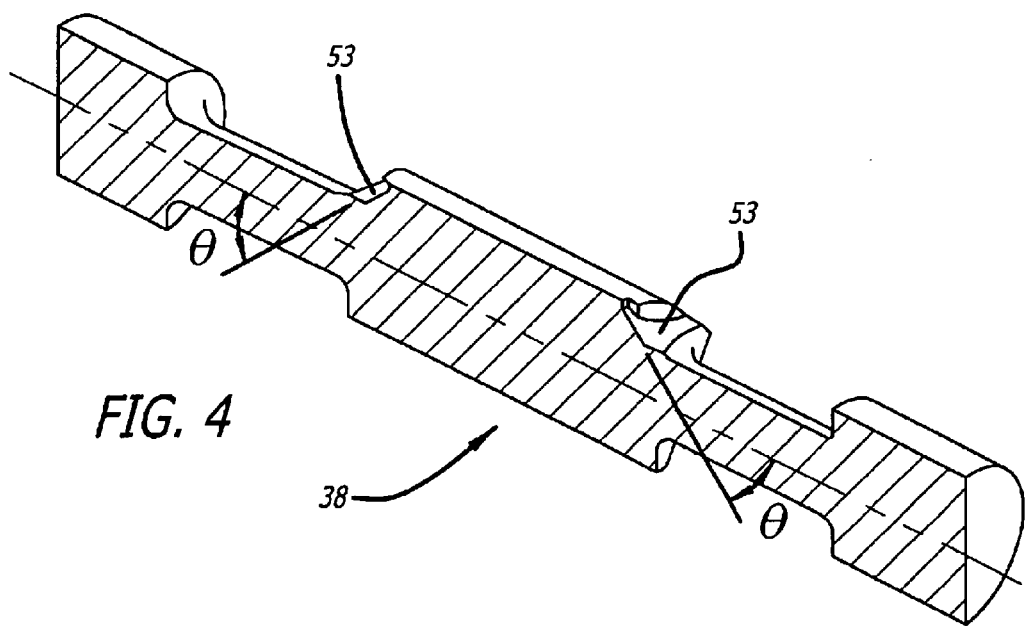
FIG. 4 is a cutaway view of the spool 38 of the proportional valve of FIG. 3.

However, in the three-way proportional spool valve 24 (FIG. 1), some of the details of which are illustrated in FIG. 2, this change in flow area versus spool position is purposely modified to reshape the flow area versus spool position. In one exemplary embodiment, this is accomplished in the manner illustrated in FIGS. 3 and 4. In that regard, FIG. 3 is a perspective view of one embodiment of the spool 38, and FIG. 4 is a sectioned perspective view providing more detail in the modified spool land shape of the spool of FIG. 3. As may be seen in FIGS. 3 and 4, the central or intermediate land on the spool 38 has a plurality of specially shaped reliefs 53 spaced around each end of the central land, which reliefs begin to open a controlled flow area with spool position prior to the peripheral edge of the land on the spool reaching the edge of the land on the valve housing, the normal position for a spool valve flow area starting to be established. The features used to shape or vary the fluid flow area in the spool 38 shown in FIGS. 3 and 4 are also shaped to minimize fluid flow variability. Specifically, as shown best in FIG. 4, the bottom portion of these fluid flow shaping features are generally sloped at an angle θ with respect to the longitudinal axis of the spool 38. In one embodiment of the spool 38, the angle θ was chosen to be about 40°. It has been found that this angled bottom portion minimizes zones of low fluid pressure (or fluid flow recirculation). In prototype valves, it was found that without this angled bottom portion, there are some conditions of operation that actually cause air to precipitate out of the working fluid (e.g., engine oil, fuel, hydraulic fluid, or other fluid) as the fluid is throttled across a particular flow area. These areas result in undesired highly variably engine valve motion.

Figure 5:
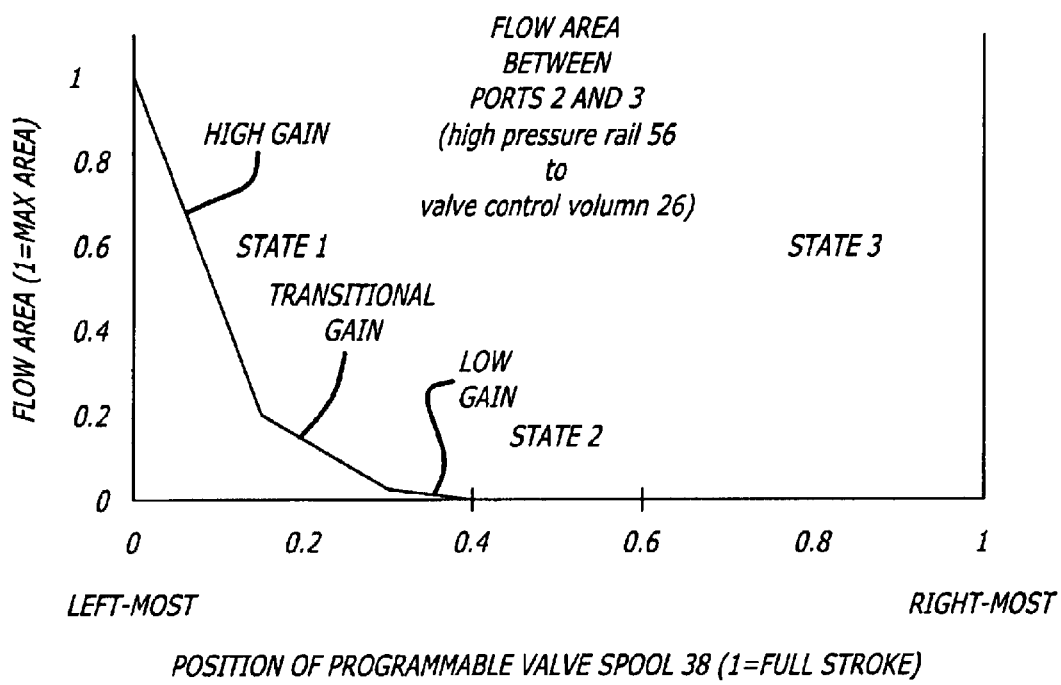
FIG. 5 is an exemplary graphical representation of the flow area versus spool position provided by the proportional valve 24 between the high pressure rail 56 and the control volume 26 of the valve actuator.
Figure 6:
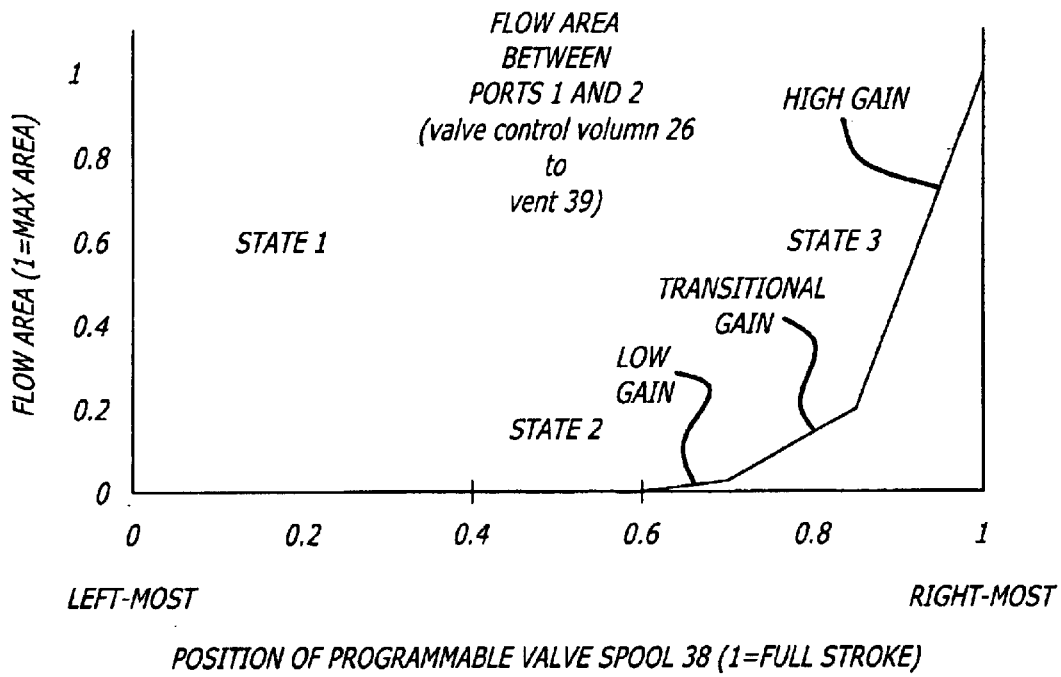
FIG. 6 is an exemplary graphical representation of the flow area versus spool position provided by the proportional valve 24 between the control volume 26 and the vent 39.

The shaped spool just described provides a customized non-linear variation in flow area versus spool position during the opening and closing of the fluid communication between selected ports, as illustrated in FIGS. 5 and 6. These Figures illustrate the fluid flow area between cylinder port 2 and supply port 3, and also drain port 1 and cylinder port 2, respectively, versus the position of the spool in the three-way proportional spool valve 24. As may be seen in FIG. 6, when the spool 38 is at the right-most position, the fluid flow area between drain port 1 and cylinder port 2 is a maximum, initially decreasing in fluid flow area at a relatively high rate for an initial motion of the spool 38 to the left, then decreasing in fluid flow area at a relatively lower rate for another or intermediate part of the motion, then decreasing in fluid flow area at a further reduced rate to a substantially zero flow area for the rest or last part of the spool motion, essentially blocking communication between drain port 1 and cylinder port 2, for example, when approximately 40% of the spool motion has been achieved. In comparison, FIG. 5 shows the fluid flow area between cylinder port 2 and supply port 3, which in the embodiment disclosed, is a mirror image of FIG. 6, though this is not a limitation of the invention and may be different. Also, because the fluid flow area goes to substantially zero before, for example, about one-half of the maximum spool travel has been achieved, fluid communication between both driver port 1 and cylinder port 2, and also cylinder port 2 and supply port 3, is stopped or blocked when the spool 38 is approximately centered within its travel range. For the specific exemplary embodiment illustrated, the substantial blockage between both drain port 1 and cylinder port 2, and also cylinder port 2 and supply port 3, occurs whenever the spool's position is anywhere between approximately 40% of its travel and 60% of its travel. Obviously other desirable shaping of the fluid flow areas, or no fluid flow rate shaping may be used if desired, though preferably some fluid flow rate shaping will be used to diminish the effect of small errors in spool position in the fluid flow restricted regions without inhibiting the maximum fluid flow areas when the spool 38 is at either of its maximum positions (i.e., left-most vs. right-most positions). As shown in FIGS. 5 and 6 illustrating one embodiment, the fluid flow area changes quite rapidly versus spool position at the left and right portions of the spool's travel. On the other hand, the fluid flow area changes at a relatively low rate versus spool position toward the central portion of the spool's travel. The portion of the spool geometry that connects each of these regions of high and low area gain is referred to as the transitional gain regions. These transitional gain regions are shaped in order to minimize fluid pressure spikes that may be caused by passing from a fluid flow area of high gain (or high fluid flow) to a fluid flow area of low gain (or low fluid flow). If desired, it is possible to design the proportional valve spool so that one or both fluid flow areas increase and then decrease. In other words, most any fluid flow area versus stroke can be tailored into the geometry of the proportional valve 24.

Referring again to FIG. 1, it may be seen that fluid in the low pressure rail 36, which may have a pressure, by way of example, of about about 20–50 bar (about 290–72.5 psi), is coupled to the right side of the three-way proportional spool valve 24 to act on the area $A_2$ (FIG. 2) of a hydraulic piston encouraging the spool to its left-most position.

Assuming pilot control valve (i.e., supply pilot valve) 22 is open and the other pilot control valve (i.e., vent pilot valve) 20 is closed, the fluid pressure in the low pressure rail 36 is communicated to line 34, and thus acts on area $A_1$ of the piston actuating the spool 38 of the proportional spool valve 24 (FIGS. 1 and 2). Because the area $A_1$ is larger than the area $A_2$, the spool 38 of the proportional spool valve 24 is forced to its right-most position, coupling drain port 1 and cylinder port 2 to couple control volume 26 to vent 39, allowing the valve return spring 32 to force the engine valve 30 to its closed position. Preferably, area $A_1$ is approximately twice area $A_2$ so that $A_1-A_2 \approx A_2$.

If the two-way pilot control valve 22 is closed and the other two-way pilot control valve 20 is open, line 34 will be vented to the drain line 35 and reservoir 37, so that the fluid pressure acting on piston area $A_1$ (FIG. 2) of the three-way proportional spool valve 24 will be substantially zero or at least relatively low. The fluid pressure acting on area $A_2$ of the spool valve 24, however, will be equal to the fluid pressure of the low pressure rail 36, thereby creating an unbalanced force on the spool 38 to force the spool 38 to its left-most or full fluid supply position. In this position, cylinder port 2 is in fluid communication with supply port 3, thereby communicating the fluid pressure in the high pressure rail 56 to control volume 26 to force engine the valve 30 open.

If, by way of example, proportional spool 24 is half open and pilot control valves 20 and 22 are both closed, then cylinder port 2 of the proportional spool valve 24 will be isolated from both drain port 1 and supply port 3, so that the fluid in the control volume 26 is trapped, thereby maintaining the engine valve 30 at its present position whatever that may be. Finally, since the two-way spool valves 20 and 22 are very high speed valves, they may be controlled in such as manner as to rapidly controllably position the spool 38 of the proportional spool valve 24 at any desired location within the extremes of its travel, and thus infinitely variably control the flow rate of fluid into or out of the control volume 26. This, in turn, allows full control and variability of the operating parameters of the engine valve 30, such as the extent of opening, the timing and duration of opening, the velocity profile of the opening and closing of the valve (which profiles can be different from each other and/or vary with engine operating conditions), and the final valve closing velocity. For example, this allows a relatively low velocity valve closing at low engine rpm for low noise operation, while still allowing the closing velocity to be increased with engine rpm, as necessary for higher engine operating speeds. Note also that the valve motion profiles for intake valves and exhaust valves may differ under any operating condition, and may change differently with changes in operating conditions.

The fluid used in the exemplary embodiment in the low pressure rail, the high pressure rail and passed to drain is engine lubrication oil, though other working fluids may be used if desired. Since the fluid flow rates in the control system for engine valve 30 will vary with various parameters, such as oil viscosity, and thus oil temperature, and the pressure of the low pressure rail and the high pressure rail, operation of the valve control system of FIG. 1 should reasonably compensate for such variations. As a first order approximation, these variations may be reasonably modeled so that the control system as shown in FIG. 1 can reasonably vary operating durations of pilot control valves 20 and 22 to at least approximate the desired profile of the proportional valve spool position with engine crankshaft angle, given the existing engine operating parameters (such as, speed, engine load, fuel temperature, air temperature, engine oil temperature, atmospheric pressure, etc.).

In the exemplary embodiment, a small Hall effect sensor 58 is positioned adjacent actuator 28 for the valve 30 so as to provide a feedback signal to the controller 33. Thus valve motion during a valve operating cycle may be monitored and used to control the operation of the pilot valves 20 and 22 for that valve operating cycle, and/or to make corrections in the next or current valve operating cycle to more accurately achieve optimum valve operation for that valve operating cycle. In that regard, more optimum operation may be determined in any of various ways, including better compliance to a predetermined engine valve position profile versus engine crank angle as predetermined for the then existing engine operating conditions and ambient conditions, or as determined by the effect of incremental changes on one or more engine performance characteristics for the change in engine valve operation just made, or a combination of both.

If multiple engine valves are to be actuated using one closed center proportional valve, the engine valves can be hydraulically or mechanically bridged. A hydraulically bridged arrangement would require an actuator on each engine valve actuated. A mechanically bridged arrangement would use only one actuator. The actuator would act on a rigid member that would transmit the hydraulic force to multiple engine valves. Also in the event two (or more) engine valves 30 are being actuated in unison by a single proportional valve 24, a sensor such as a position sensor 58 (Hall effect sensor or other position sensor) may be used on only one of the engine valves, or on both engine valves, the sum of the signals providing a better average indication of the position profile of the two engine valves and the difference in the signals providing fault detection, such as a sticky engine valve. While a position sensor(s) 58 is shown, other types of sensors could be used, such as a velocity sensor, as the integration times to convert to position are short. In that regard, at the end of each engine valve operating cycle, the pilot control valve 22 is actuated to couple line 34 to the low pressure rail 36 and pilot control valve 20 is actuated to decouple line 34 from the drain line 35 to hydraulically move the spool 38 against a stop at the position shown schematically in FIG. 1. This provides predetermined spool and pilot valve starting points for each engine valve operating cycle so that errors in the spool valve position do not accumulate, valve operating cycle to valve operating cycle. If desired, a sensor may also be used to sense the position of the proportional spool valve spool 38.

Thus the two pilot control valves 20 and 22 selectively control the position of the proportional valve 24. Specifically, the supply pilot control valve 22 allows fluid to flow between a low-pressure rail 36 (about 20–50 bar or about 290–725 psi) and a first piston used to move the proportional 3-way valve 24. The vent pilot control valve 20 will allow fluid to flow from the piston to the drain line 35 at a relatively low fluid pressure, such as atmospheric pressure or slightly higher (for example, about 1 to 5 bar). Using these pilot control valves 20, 22, the position of the proportional valve 24 can be changed quickly and accurately. The position of the proportional valve 24 can be infinitely varied throughout multiple flow states, such as the 3 flow states shown in FIGS. 5 and 6, namely:

State 1: The high pressure fluid from the high pressure rail 56 (about 100–240 bar or about 1450–3480 psi) is allowed to flow from the high pressure rail to a control volume 26 above the engine valve actuator 28.

State 2: The spool 38 of the proportional valve 24 is centered between its hard stops, trapping fluid in the control volume 26 above the engine valve actuator 28 and creating a hydraulic lock and establishing a desired stationery position of the engine valve 30.

State 3: The fluid in the control volume 26 above the engine valve actuator 28 is vented to atmospheric pressure or slightly higher (for example, about 1–5 bar or 14.5–72.5 psi typical).

As the proportional valve moves from state 2 to state 1, the area through which high-pressure fluid from the high pressure rail 56 can flow into the control volume 26 above the engine valve actuator 28 increases nonlinearly. (See FIG. 5). Similarly, as the proportional valve 24 moves from state 2 to state 3, the area through which fluid can flow out of the control volume 26 above the engine valve actuator 28 to drain 39 increases nonlinearly (See FIG. 6). Thus the geometry of the proportional spool valve 24 has been designed with regions of high and low gain. The low gain regions provide fine control for desired take-off and seating velocities, while the high gain region provides the large fluid flow area required to achieve desired maximum engine valve velocities. This facilitates more accurate control of the engine valve 30 during seating and take-off. These areas need more accuracy so that proper seating velocities and valve overlap are achieved throughout the full range of engine speed and temperature.

To better describe the function of the exemplary hydraulic system, the following descriptions trace the system through a complete engine valve operating cycle, based on results from a nodal hydraulics simulation.

To provide an overview of the operation of the present invention, an overview of an exemplary valve event will first be described. Initially the supply pilot control valve 22 is open and the vent pilot control valve 20 is closed (as illustrated in FIG. 1). This keeps the proportional valve spool 24 in the venting (right-most) position (State 3, FIGS. 5 & 6). Specifically, the fluid flow area in the spool valve 24 communicating between engine valve actuation control volume 26 and vent 39 is at a maximum (state 3, FIG. 6) and the fluid flow area in the spool valve 24 communications between engine valve actuation piston control volume and the high-pressure rail is closed (state 3, FIG. 5). As a result, the engine valve 30 is biased closed against its seat by the return spring 32.

To initiate valve opening of the engine valve 30, the supply pilot control valve 22 is closed and the vent pilot control valve 20 is opened. This allows fluid to flow from the control volume of the proportional spool valve 24 to vent. As a result, the spool 38 begins to move from state 3. The vent pilot control valve 20 is left open long enough for the spool 38 to pass through state 2 and into state 1. However, the proportional valve is only allowed to travel until just a small flow area in the low gain region of state 1 is open between the high-pressure rail (FIG. 5) and engine valve actuation control volume 26. This results in a relatively slow take-off (i.e., relatively low initial velocity) of the engine valve 30. The speed of this take-off will vary depending on where the proportional valve 24 is stopped. Then the vent pilot control valve 20 is opened once again so that the spool 38 moves to a position that opens a larger fluid flow area between the high pressure rail 56 and the engine valve actuation control volume 26. This results in a rapid opening of the engine valve 30 after the initially slow takeoff.

The engine valve 30 now must stop at the desired lift, for example, about 10 millimeters or about 0.4 inches. To do this, the spool 38 will be moved to state 2 in which the control volume 26 above the engine valve 30 is hydraulically locked. This is achieved by closing the vent pilot control valve 20 and opening the supply pilot control valve 22 for the required amount of time. The engine valve 30 will stay in this position until it is commanded to return. At this point, the kinetic energy in the engine valve 30 is fully converted into potential energy of the fluid in the control volume 26 and the engine valve return spring 32. This trade off between kinetic and potential energy occurs several times while the control volume 26 is hydraulically locked, which can result in a slight oscillation in the position of the engine valve 30. To reduce this effect and to recover some of the kinetic energy in the engine valve actuator 28, a check valve may also be placed between the control volume 26 of the engine valve actuator 28 and the high-pressure rail 56 in order to damp out any high pressure spikes that may occur during operation. In addition, this oscillation may be reduced by stopping the proportional valve 24 in a position of reduced area between the high pressure rail 56 and the control volume 26 before the proportional valve 24 stops in state 2 where the control volume 26 is blocked. This can minimize pressure spikes in control volume 26 that cause the aforementioned oscillation.

Next, the supply pilot control valve 22 will be opened again long enough to move the proportional valve 24 to the high gain region of state 3, and then closed, at least before vent pilot control valve 20 is again opened. To reiterate, at this point the fluid flow area in the proportional valve 24 communicating between the engine valve control volume 26 and vent 39 is a maximum. Therefore, the engine valve 30 will accelerate very quickly toward its seat via the stored energy in the compressed return spring 32.

In order to seat the engine valve 30 at the desired velocity, the fluid flow area in the proportional valve 24 that communicates between the engine valve control volume 26 and drain 39 must be restricted. This can be achieved by once again opening the vent pilot control valve 20 for a short period to reposition the proportional valve 24 to a low gain in state 3. This seating velocity will change (and therefore can be selected) depending on where the proportional valve is stopped in this region.

This completes one cycle of the engine valve 30. In order to prepare the system for the next event, all components are repositioned to their initial conditions. The only component that is out of position is the proportional valve 24. The supply pilot control valve 22 is again opened, returning the proportional valve 24 to a position of maximum fluid flow area in state 3. This reestablishes a reference point at the beginning of each valve event, so that errors in proportional valve positioning do not accumulate, one valve cycle to another. In this way, the seating velocities desired at different engine speeds, loads and temperatures can be achieved by changing the position at which the proportional spool 38 dwells. This can be facilitated further by varying the fluid pressure in the low-pressure rail 36 if desired, thus accomplishing finer control of the proportional spool valve 24.

Figure 7:
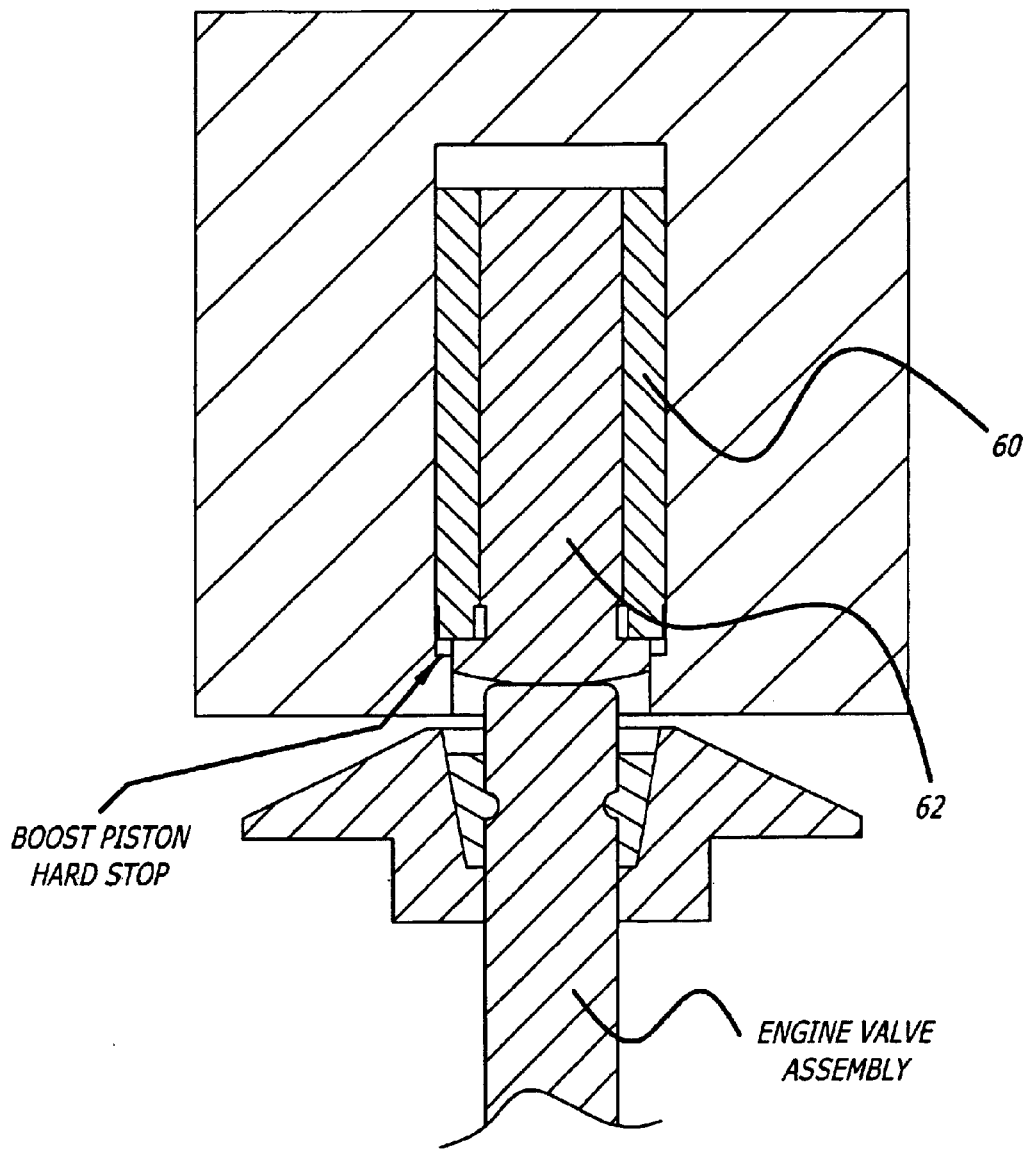
FIG. 7 is a cross sectional view of an engine valve actuator comprising two concentric pistons that may be used with the present invention.

In a simulation of the system described above, an engine valve actuator 28 comprising two concentric pistons was used, as illustrated in FIG. 7. Instead of using one actuator with a relatively large area exposed to pressure to drive the engine valve 30 through its entire stroke, the relatively larger piston (boost piston 60) is used only initially to achieve peak accelerations before reaching a mechanical stop, while the remainder of the stroke is accomplished using a relatively smaller telescoping piston (drive piston 62). Specifically, when the engine valve, particularly an exhaust valve, initiates lift from its seat, combustion chamber pressure remains substantial. In addition, maximum engine valve acceleration is also required at this time. As a result, a greater force is needed to actuate the engine valve through the beginning of its stroke while a much lower force is required for the remainder of the stroke. The present invention system does not have to use the two concentric piston design, as it will also function if just one actuator is used. However, the two concentric piston design requires less working fluid from the high pressure rail for each valve cycle, and thus requires less energy for engine valve operation.

Figure 8:
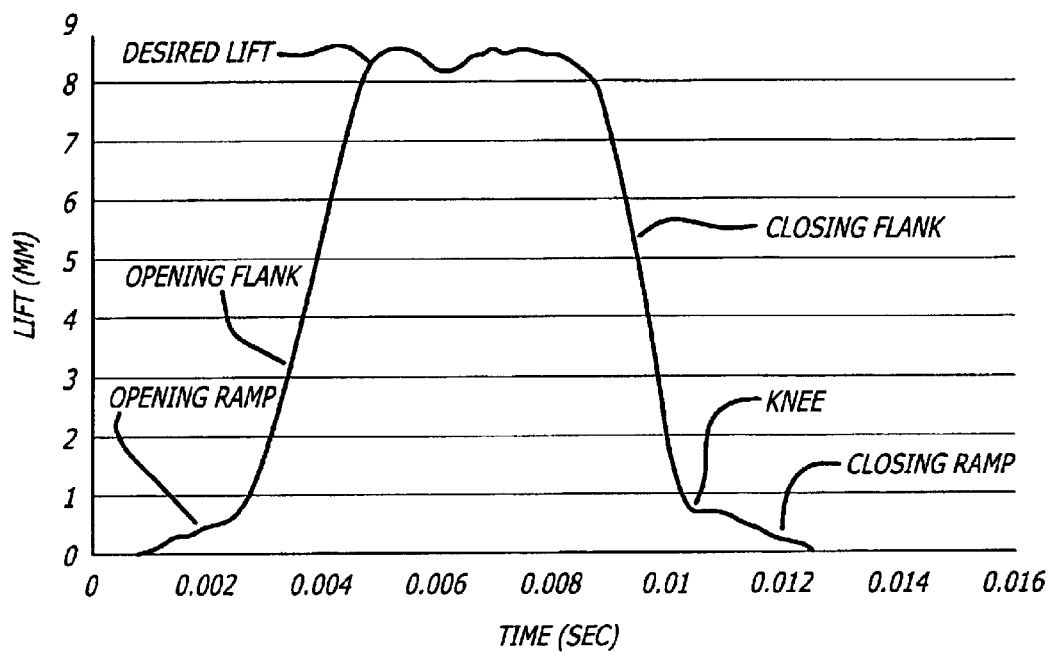
FIG. 8 defines the different areas of the engine valve profile referred to in this disclosure.

Having provided an overview of an exemplary valve event, further details of possible valve events will now be provided. In order to more easily describe the engine valve motion, FIG. 8 defines the different areas of the engine valve profile that will be referred to throughout the remainder of this disclosure. The engine valve event used for this description is based on a nodal hydraulics simulation assuming 100° C. 0W30 synthetic motor oil at an engine speed of about 2800 rpm. The engine valve event itself is shown graphically in FIG. 9. In this example shown in FIG. 9, the x-axis represents time, and ranges from 0 to 0.018 seconds, or an engine crankshaft rotation of slightly over 300 degrees. As shown in the Figure, certain parts of the system have common reference positions, and accordingly, all curves, particularly the curves departing from common references, are carefully labeled in accordance with the following:

| | |
|---|---|
| A | Displacement of boost piston 60 (see FIG. 7) |
| B | Proportional valve fluid flow area-communicating between supply (high pressure rail-see FIG. 1) and valve control volume 26 |
| C | Proportional spool position |
| D | Vent pilot control valve position (see FIG. 1) |
| E | Displacement of drive piston 62 (see FIG. 7) |
| F | Proportional valve fluid flow area-communicating between valve control volume 26 and vent 39 (see FIG. 1) |
| G | Supply pilot control valve position (see FIG. 1) |

Figure 9:
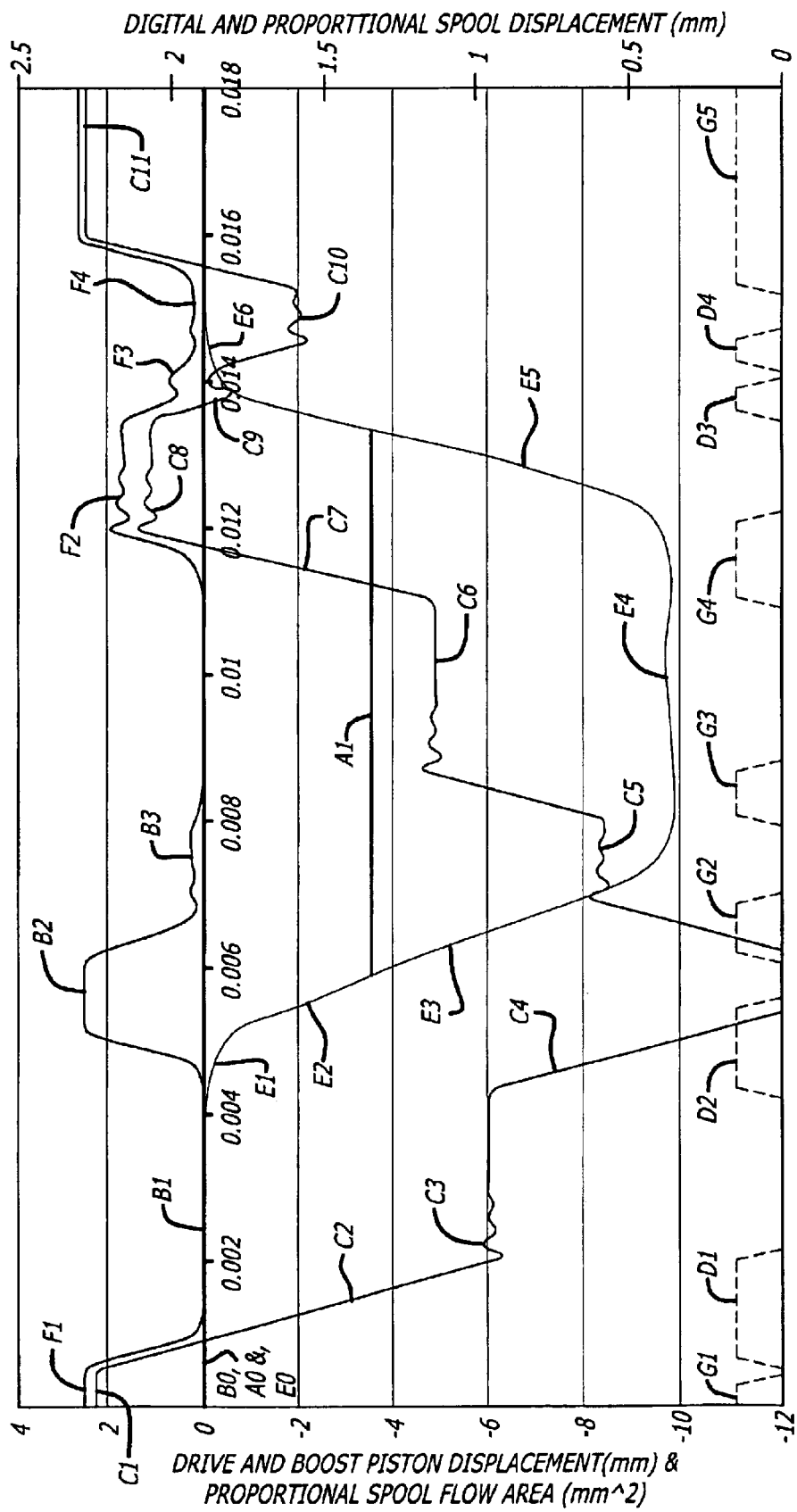
FIG. 9 graphically illustrates an exemplary complete valve event.

In the description to follow, the relevant portion of each curve being referred to at any time will be identified in FIG. 9 by the appropriate letter followed by a number, and referenced in the description by the same letter and number in parentheses.

In FIG. 9, the left side of the y axis represents the drive and boost piston displacement in millimeters and the proportional valve fluid flow area multiplied by the discharge coefficient ($C_D$) of proportional valve 24 in millimeters squared. The right side of the y axis represents the spool displacement in millimeters for the supply pilot control valve, the vent pilot control valve and the proportional valve. The engine valve event comprises a plurality of individual pilot control valve and proportional valve events.

Initial Positions (time=zero)

Referring again to FIG. 9, the initial position of all system components at the beginning of an engine valve event may be seen. The supply pilot control valve (G1) is open and the vent pilot control valve (D1) is closed. This keeps the proportional valve (C1) in the right-most position (State 3, FIGS. 5 and 6). Specifically, the fluid flow area (F1) open between the engine valve control volume 26 and vent 39 is at a maximum. The flow area (B0) open between engine valve actuation control volume 26 and the high-pressure rail 56 is closed. As a result the engine valve 30 is forced closed against its seat by the return spring 32, and the drive piston (E0) and boost piston (A0) are forced to their initial or reference positions.

The First Event

The supply pilot control valve is shut off or closed the vent pilot control valve (D1) is opened. (Note that the initiation of an engine valve event triggered by this opening of the vent pilot control valve can actually occur at any time, thereby providing an infinitely variable valve timing.) This allows fluid to flow from the control volume of the spool 38 of the proportional valve 24 to vent 37. The area exposed to control volume pressure acting on the proportional spool 38 has an area of approximately 2*A. As seen in FIG. 2, the opposite end of the proportional spool 38 is acted on by the low pressure rail 36 through a surface having an area of 1*A. Once the control volume of the proportional spool 38 is vented, the proportional spool (C2) begins to move left from state 3 (FIGS. 5 and 6) toward state 2. The vent pilot control valve is left open (D1) long enough for the proportional spool (C2) to pass through state 2 and into state 1. The proportional valve 24 is only allowed to travel (C3) until a small flow area (B1) in state 1 is open between support port 3 (and consequently, the high-pressure rail 56) and the engine valve control volume 26. This small area allows only a small amount of fluid to flow into the engine valve control volume 26, resulting in a relatively low velocity opening ramp (E1) of the engine valve 30.

The speed of this take-off will vary (and therefore can be selected) depending on where in state 1 the proportional valve is stopped. In other words, if the vent pilot control valve is left open longer, the proportional spool 38 will open a larger area in state 1 resulting in a higher velocity opening ramp. If a relatively slow opening ramp is not required, this event may be skipped.

The Second Event

The vent pilot control valve (D2) is opened and closed once again so that the proportional spool 38 moves (C4) to a position that opens a relatively larger fluid flow area (B2) in state 1. Fluid can now travel into the engine valve control volume 26 at a relatively higher rate resulting in a relatively higher velocity valve motion (E2). This high velocity engine valve motion is referred to as the opening flank (See FIG. 8). Again, the velocity of the opening flank will increase as more fluid flow area in state 1 is opened. More fluid flow area is uncovered in state 1 when the vent pilot control valve 20 (D2) is left open longer. When the boost piston 60 reaches the limit of its travel (A1), it stops, with the drive piston (E3) continuing to open the engine valve 30.

The Third Event

Various alternative strategies may be used to stop the engine valve 30 at a desired lift In one alternative strategy, a single proportional valve move is used to stop the engine valve 30 at a desired lift, in this particular example, 10 mm (0.40 inches). (The lift is controlled by when event 3 is initiated. The engine valve lift is proportional to the amount of time between events 2 and 3. This fact results in variable valve lift capability of the system). To do this, the proportional spool 38 can be moved from state 1 to state 2 (FIGS. 5 and 6). When the proportional valve 24 is in state 2, the fluid in the control volume 26 above the engine valve 30 cannot communicate with either the high pressure rail 56 or the vent 39. From this point on, state 2 will sometimes be referred to as the hydraulically locked region. If the proportional valve 24 is moved from a position where a relatively large fluid flow area is opened in state 1 to the hydraulically locked region of state 2, a significant amount of undesirable hydraulic oscillation may sometimes occur. Specifically, at this point in the valve event, the engine valve velocity is near a maximum. If the fluid flow area in the proportional valve 24 communicating between the high pressure rail 56 and the engine valve control volume 26 is suddenly shut, the kinetic energy of the engine valve actuator 28 would continue to open the engine valve 30. This motion would continue to increase the volume of the engine valve control volume 26. Because the proportional valve 24 is in state 2, no new fluid can enter this increasing control volume 26. This results in a sudden pressure decrease in this control volume. The fluid pressure will continue to decrease until it is low enough that the force of return spring 32 closing the engine valve 30 becomes greater than the hydraulic force opening the engine valve. At this point the engine valve 30 begins to decelerate and eventually reverses direction. This change in direction of engine valve motion now begins to decrease the control volume 26 causing the fluid pressure to rise until the direction of engine valve motion is once again reversed. This hydraulic oscillation (opening and closing) will continue until it is damped out by viscous drag, structural damping, etc. This "single move strategy" can be used to stop an engine valve 30 at a desired lift depending on what amplitude of hydraulic oscillation is acceptable. The oscillation amplitude at the desired lift will decrease as the commanded opening flank velocity decreases. The opening flank velocity is low when the engine valve 30 is opened to low lifts. Flank velocities are also decreased when relatively small fluid flow areas in the proportional valve 24 are opened in state 1 of the proportional valve during the second event.

In another alternative lift strategy, two proportional valve moves are used to stop the engine valve 30 at a desired lift. This strategy is specifically illustrated in FIG. 9. To decrease the amount of hydraulic oscillation that occurs at the desired lift, the proportional valve 24 will not be moved from state 1 directly to state 2, but instead to a location (C5) that leaves a small amount of fluid flow area in the proportional valve 24 open in state 1 (B3) before continuing its travel to state 2 (C6). This is done by quickly opening (G2) and then closing the supply pilot control valve 22 so that the proportional valve 24 moves from a relatively large fluid flow area in state 1 to a relatively smaller fluid flow area in state 1. This relatively small fluid flow area throttles the fluid flow entering the engine valve control volume 26 from the high pressure rail 56. This throttling causes a large fluid pressure drop to occur across the proportional valve 24, resulting in a decrease in the fluid pressure within the engine valve control volume 26. Because fluid is still allowed to enter the control volume 26, the fluid pressure in the control volume 26 will not drop as quickly as it did in the first strategy, resulting in a relatively slower deceleration of the engine valve 30. Once the engine valve 30 reaches a velocity of approximately zero, the supply pilot control valve 22 is opened and closed again (G3) so that the proportional valve 24 enters state 2 (C6). The engine valve 30 cannot continue to open because it no longer has kinetic energy. The fluid pressure in the engine valve control volume 26 at this time is a function of the amount of fluid allowed into the control volume 26 via the proportional valve fluid flow area opened in state 1 (B3). If the fluid flow area opened during the deceleration of the engine valve 30 is too small, not enough fluid enters this control volume 26 resulting in a hydraulic force opening the engine valve 30 less than that of the force of the return spring 32 biasing the engine valve 30 to closure when the zero velocity point is achieved. On the other hand, if too much fluid flow area is opened, the engine valve 30 will not decelerate to a velocity of zero at the desired lift. Consequently, the engine valve 30 will have kinetic energy when the proportional valve 24 is moved to the hydraulically locked region (C6) of state 2 and oscillation will occur as described in strategy 1. There is an optimal area that can be opened during the deceleration of the engine valve 30 so that the hydraulic force opening the engine valve 30 is equal to the force of the return spring 32 biasing the engine valve 30 to closure when the zero velocity point is achieved and the proportional valve 24 is shifted to state 2. This will result in little to no hydraulic oscillation of the engine valve 30 at the desired lift.

When running this system, preferably the control algorithm will set the fluid pressure in the high pressure rail 56 based on the desired engine valve lift. The foregoing lift strategies will have the least amount of hydraulic oscillation if the rail pressure for a given engine valve lift is set so that the opening force resulting from the rail pressure acting on the engine valve actuator is equal to that of the closing force supplied by the return spring 32 at the desired lift.

If a small amount of hydraulic oscillation is acceptable when the engine valve 30 dwells at a desired lift, a still further alternative lift strategy can also be achieved by setting the high pressure rail 56 to a fluid pressure lower than what is necessary to equilibrate the engine valve return spring 32 at the desired lift. This is called the "overshoot" or "over-travel strategy". When this strategy is used, the engine valve 30 is allowed to "overshoot" the lift at which the rail pressure and the engine valve spring 32 would supply equal but opposite forces on the engine valve 36. The overshoot occurs due to the fact that the engine valve 30 has not been decelerated to a velocity of zero at this lift and therefore still has momentum that will carry the engine valve 30 to a higher lift. As the engine valve 30 travels to this higher lift, the volume of the control volume 26 increases. This increase in volume causes a fluid pressure drop over the proportional valve spool 38 and fluid enters the control cavity 26 from the high pressure rail 56. To reiterate, the fluid entering the engine valve control volume 26 during overshoot is not pushing the engine valve 30 open, but instead is back-filling the volume swept by the engine valve actuator 28 due to its momentum. When the velocity of the engine valve 30 reaches approximately zero, the proportional valve 24 is moved to state 2 (C6). The pressure of the fluid in the control volume 26 at this point is less than what is required to equilibrate the force of the return spring 32. As a result, the control volume 26 will decrease (thus moving the engine valve 30 in the closed direction) until the fluid pressure increases enough to equilibrate the force of the return spring 32. On the whole, the engine valve 30 has opened to a desired lift using a fluid pressure less than what is required to equilibrate the return spring 32 at that lift. The overshoot strategy is a more energy efficient way to operate the engine valve 30 than the equilibrium strategy.

The Fourth Event

The engine valve 30 will stay open at the desired lift until it is commanded to return. This command can occur at any time, thereby providing a variable valve event duration. When the engine valve is to return toward the closed position, the supply pilot control valve 22 (G4) will be opened and closed again so that the proportional valve 24 will move (C7) from state 2 to a relatively large fluid flow area region in state 3 (C8). At this point the fluid flow area in the proportional valve 24 communicating between the engine valve control volume 26 and drain port 1 is once again opened. Therefore, the engine valve 30 will (via stored energy in the compressed return spring 32) accelerate (E5) toward its seat. The peak velocity of this closing flank is determined by the fluid flow area (C8) opened in state 3. The more the fluid flow area is opened, the higher the peak closing flank velocity is achieved.

The Fifth Event

Figure 10:
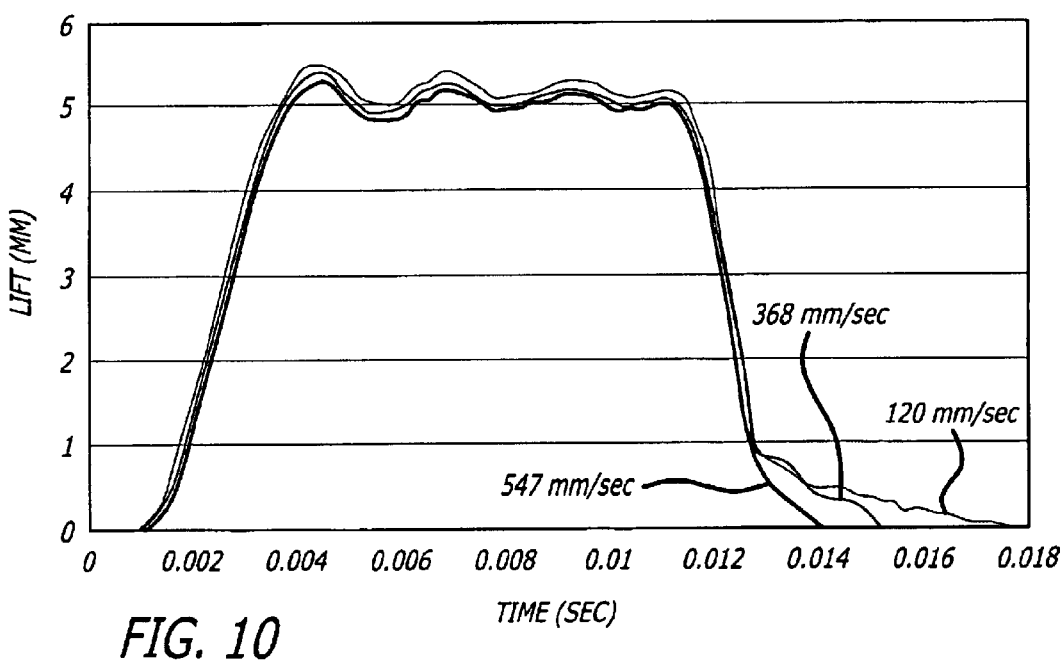
FIG. 10 illustrates variable valve seating velocity that may be obtained with the present invention.

In order to close the engine valve 30 at the desired closing ramp velocity (E6) (also called seating velocity), the fluid flow area (F2) in the proportional valve 24 that communicates between the engine valve control volume 26 and drain port 1 must be restricted. A certain fluid flow area between the engine valve control volume 26 and drain port 1 will result in a specific engine valve seating velocity (See actual valve traces in FIG. 10). If the transition (F3) from the large fluid flow area (F2) of state 3 used for the high velocity closing flanks, to the restricted fluid flow area (F4) of state 3 used for low velocity seating occurs too rapidly, (that is in one move of the proportional valve 24) then undesirable fluid pressure spikes may occur that may cause oscillatory motion of the engine valve 30. These fluid pressure spikes may be acceptable if they are small enough so that they do not result in a reversal in the direction of motion of the engine valve 30. Cases in which these fluid pressure spikes are usually acceptable occur when the ratio of closing flank/closing ramp is below a certain threshold. For example, if the engine valve's closing flank is 5 m/sec (16.4 ft/sec) and the desired closing ramp velocity is 300 mm/sec (0.98 ft/sec), then the proportional valve 24 could be moved from the relatively large fluid flow area in state 3 (F2) to the relatively small fluid flow area in state 3 (F4) that would result in a 300 mm/sec (0.98 ft/sec) closing ramp in one move. Opening and closing the vent pilot control valve 20 once accomplishes this one move.

If a relatively lower closing ramp velocity such as 80 mm/sec (0.26 ft/sec) is desired, an intermediate move of file proportional spool 38 may be needed in order to decrease the fluid pressure spike resulting from this sudden restriction of fluid flow area. FIG. 9 shows the spool of the vent pilot control valve 20 (D3) being pulsed so that the proportional valve 24 is moved to this intermediate area in state 3 (C9). This causes fluid exiting the engine valve control volume 26 to be throttled across the proportional valve 24 resulting in relatively high fluid pressure in the engine valve control volume 26. This high fluid pressure causes the engine valve 30 to begin to slow down. Once the velocity (E6) of the engine valve 30 has decreased significantly, the spool of the vent pilot control valve 20 is pulsed again (D4) so that the proportional valve 24 is moved (C10) so that the fluid flow area required to get an exemplary seating velocity of 80 mm/sec (0.26 ft/sec) is achieved. Again the fluid pressure in the control volume 26 rises, slowing the engine valve 30 to this selected 80 mm/sec (0.26 ft/sec) closing ramp velocity. To reiterate, a much higher fluid pressure spike would occur if the fluid flow area in the proportional valve 24 communicating between the control volume 26 and the drain port 1 were decreased in a single move of the proportional valve 24.

The Sixth Event

This completes one engine valve cycle. In order to get the system ready for the next event, all components are placed back to their initial positions. The only components that are out of place at this point are the proportional valve 24 (C10) and the spool of the supply pilot control valve 22 (G5). The supply pilot control valve 22 is switched on, returning the proportional valve 24 to a position (C11) of maximum fluid flow area in state 3. This facilitates the controller 33 in reestablishing a reference point at the beginning of the next engine valve event.

It has already been mentioned that by moving the proportional valve 24 to different selectable positions, different selectable engine valve opening and closing flanks and different selectable opening and closing ramps can be achieved. In a similar fashion, this system can respond to changes in working fluid viscosity due to temperature, thermal breakdown, contamination, etc. For example, if the desired seating velocity for an engine valve 30 at a given engine operating point is 100 mm/sec (0.33 ft/sec), a specific fluid flow area must be opened by the spool 38 of the proportional valve 24 in order to achieve this velocity. As the viscosity of the working fluid increases, more fluid flow area can be opened to account for this change so that the seating velocity will remain at the exemplary desired 100 mm/sec 0.33 ft/sec).

The present invention is also capable of accounting for differences between engine valve hardware. For instance, differences in spring rate of the return spring 32, assembled preload force of the return spring 32, viscous drag between actuators 28, leakage rate in the pilot control valve 20, 22 etc. can cause two engine valves 30 to respond differently to similar commands from the engine controller 33. Because the controller 33 preferably used with the present invention is closed loop and adaptive, it can sense these differences between engine valves and adjust commands sent to the pilot control valves 20, 22 accordingly so that the proportional valve 24 will open the proper amount of fluid flow area at the proper time so that all engine valves actually do what they have been commanded to do. Similarly, this system is capable of changing engine valve profiles very rapidly in response to changing engine rpm, engine loads, exhaust gas recirculation requirements, etc.

Figure 16:
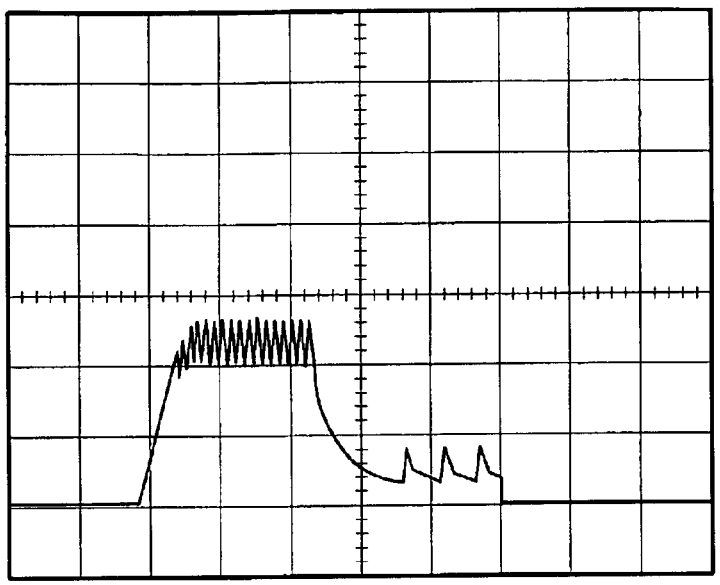
FIG. 16 shows an exemplary peak and hold current trace that may be used to actuate the pilot valves.

The use of the magnetically latching spool valves for the supply pilot control valve 22 and the vent pilot control valve 20 is preferred, as these valves require a relatively minimum amount of electrical energy. In order to further reduce the electrical energy used by the system, a peak and hold electrical current strategy can be used to operate the digital pilot control valves 20, 22. In one embodiment, for example, a 5 amp current with a pulse width of approximately 500 ps was needed to ensure stable, repeatable motion of the pilot control valves 22, 22. From the time the pilot control valve is signaled to move until it opens or closes only takes about 200–300 $\mu$s. For the remaining 200–300 $\mu$s, the spool of the pilot control valve may bounce off the endcap or hardstop it has moved to. Because the air gap between the spool of the pilot control valve and the endcap is very small when it is bouncing, only a fraction of the electrical current is needed to keep the spool of the pilot control valve opened or closed after it has impacted the endcap. For this reason at about 300 $\mu$s, the electrical current may be reduced from, for example, 5 amps to 1 amp. After testing this peak and hold strategy, there was no noticeable degradation in the performance of the pilot control valve. There was, however, a 40% decrease in electrical energy used. FIG. 16 shows an exemplary peak and hold current trace used to actuate one of the pilot control valves 20, 22.

One advantage of using these low electrical currents (1–5 amps) is that it significantly reduces the required size of the electronics that are used on this system. Advantageously, connector sizes are small, surface mount chips can be used, electrical current traces on circuit boards can be reduced in size, etc.

Because the engine valve actuator 28 in one embodiment of the present invention is concentric to the engine valve 30, there is less side loading experienced by the engine valve 30 when compared to a cam driven valve using a rocker arm. For this reason it is possible to use an engine valve 30 with a reduced stem diameter.

Also minimizing the control volume 26 that exists above the engine valve actuator 28 greatly increases the ease in which the engine valve 30 can be seated. This is primarily due to the fact that the reduced control volume 26 causes the system to be less compliant. As a result, hydraulic oscillation occurs at a relatively high frequency with relatively low amplitude as opposed to a more compliant system (with a larger control volume) that would have, relatively speaking, low frequency, higher amplitude hydraulic oscillations. The relatively high frequency low amplitude oscillation is much easier for the controller to deal with when trying to seat the engine valve 30 at a desired velocity.

Shallow grooves may be provided on the engine valve actuator 28, the spool 38 of the proportional valve 24 and even the spool of the pilot control valves 20, 22. These shallow grooves are placed on the aforementioned components so that these components still effectively contact their respective bores over the same length. The grooves advantageously diminish the viscous drag experienced by the component as it is moved in its bore. This reduction in viscous drag will be most noticeable at cold operating temperatures.

Figure 11:
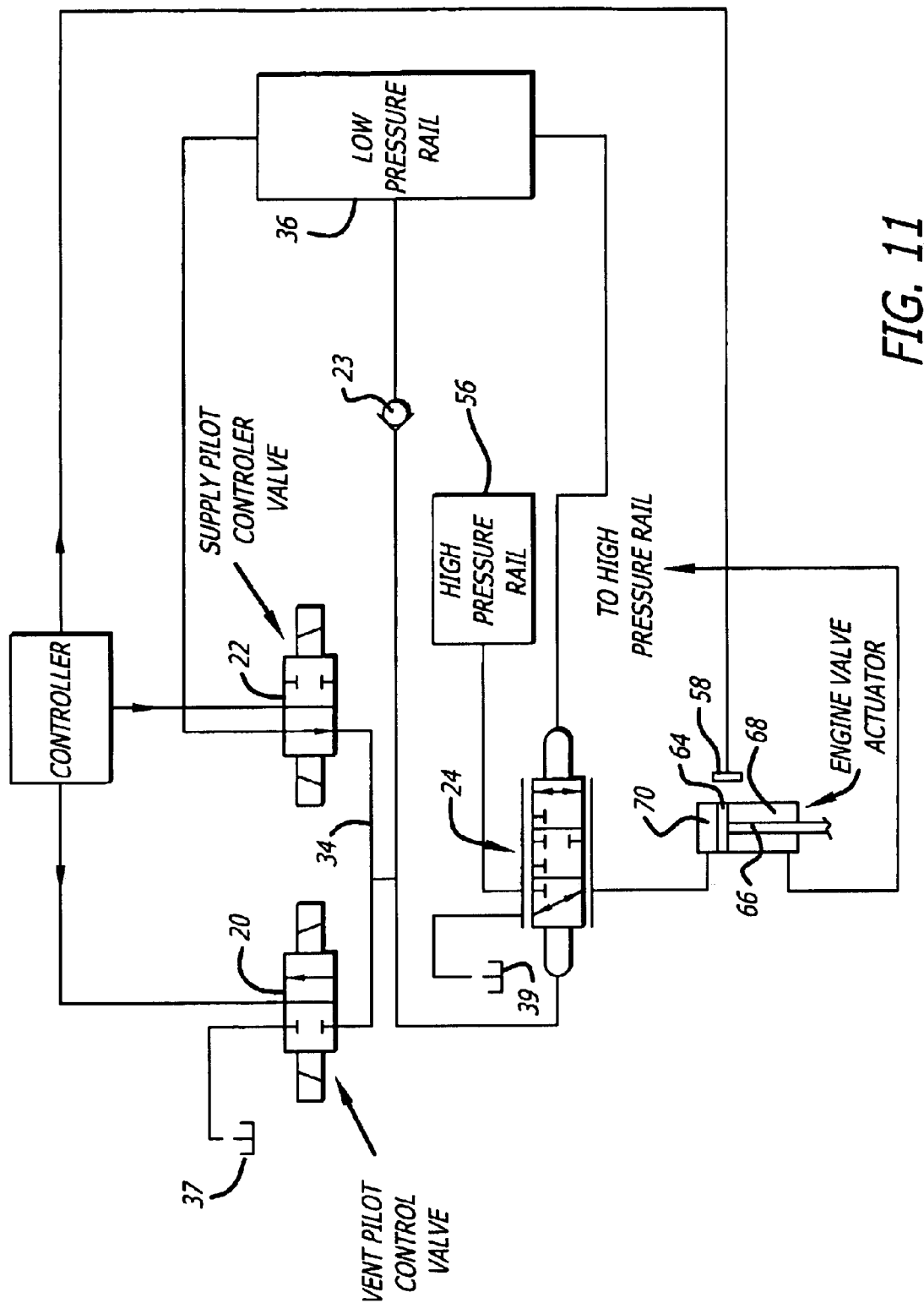
FIG. 11 is a diagram of an alternative embodiment of the present invention that controls a hydraulically returned engine valve using a closed center 3-way proportional valve.

Alternatively, one can also substitute a hydraulically returned engine valve in place of a spring returned engine valve, as illustrated in FIG. 11, or a combination of both hydraulic return and spring return. In this embodiment, the valve actuator comprises a piston 64 having a cross-sectional area $A_3$ on a piston rod 66 having a cross-sectional area $A_4$. Chamber 68 is permanently coupled to the high pressure rail 56, and control volume 70 is switchable by the proportional valve 24 between the high pressure rail and the vent. Consequently, the maximum force required to open the engine valve is equal to the fluid pressure of the high pressure rail times $A_4$ and the maximum force required to close the engine valve is equal to the fluid pressure of the high pressure rail 56 times $A_3-A_4$.

With a return spring, the spring closing force is at a minimum when one desires a relatively large opening force for maximum acceleration against peak combustion chamber pressure. With hydraulic return of the engine valve, the closing force of a hydraulically returned engine valve is constant and therefore will be higher than that of a return spring when the engine valve is seated. Therefore, the force characteristic of a mechanical spring may be more desirable for returning the engine valves than a single piston return mechanism, though use of a hydraulic return is within the scope of the invention. Further, active hydraulic valve return wherein active and selective control of the hydraulic fluid pressure returning the engine valve to the closed position is also within the scope of the invention.

Figure 12:
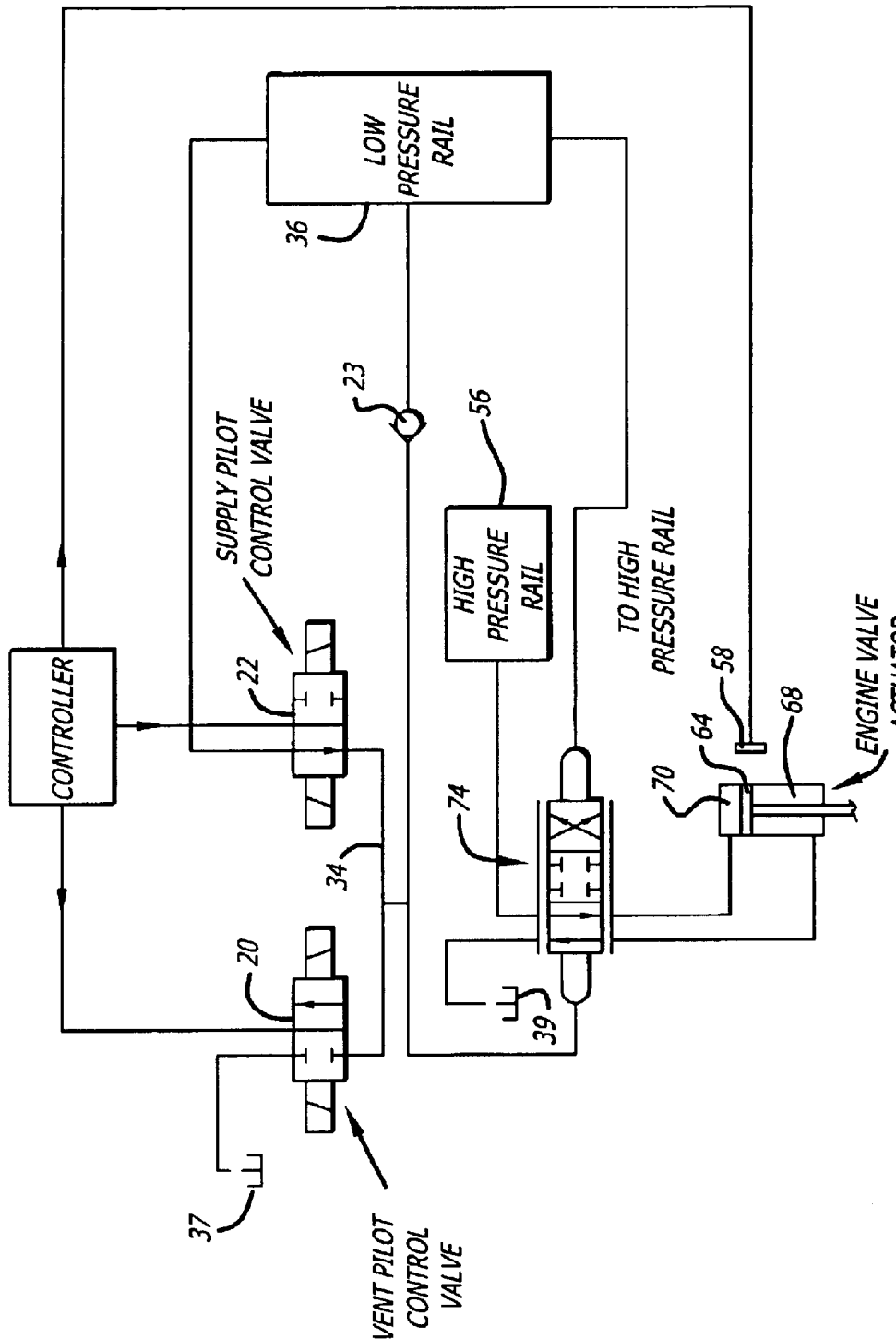
FIG. 12 is a diagram of another alternative embodiment of the present invention that controls a hydraulically returned engine valve using a closed center 4-way proportional valve.

Instead of using a closed center 3-way proportional valve, the hydraulically returned system may also be alternatively constructed using a closed center 4-way proportional valve 74 (FIG. 12). Like the closed center 3-way proportional valve, the position can also be infinitely varied throughout 3 flow states.

State 1: The high pressure fluid is allowed to flow from the high pressure rail 56 to a control volume 70 above the engine valve actuation piston 64 while the fluid in chamber 68 acting on the opposing side of the engine valve actuation piston 64 is vented to tank 39.

State 2: The proportional valve 74 is centered between its hard stops, trapping fluid in the control volume 70 above the engine valve actuation piston 64 and in the control volume 68 acting on the opposing side of the engine valve actuation piston, thus creating a hydraulic lock.

State 3: The fluid in the control volume 70 above the engine valve actuation piston 64 is vented to a relatively low fluid pressure or atmospheric pressure while high pressure fluid is allowed to flow from the high pressure rail 56 to the control volume 68 acting on the opposing side of the engine valve actuation piston 64.

As the proportional valve 74 moves from state 2 to state 1, the area in the proportional valve 74 through which high-pressure fluid can flow into the control volume 70 above the engine valve actuation piston 64 increases nonlinearly (similar to FIGS. 5 & 6). At the same time, the flow area in the proportional valve 74 communicating between the fluid below the engine valve actuation piston 64 and tank or vent 39 increases nonlinearly. Similarly, as the proportional valve 74 moves from state 2 to state 3, the area in the proportional valve 74 through which fluid can flow out of the control volume 70 above the engine valve actuation piston 64 to tank 39 increases nonlinearly. At the same time the flow area between the fluid below the engine valve actuation piston 64 and the high-pressure rail increases nonlinearly.

Figure 13:
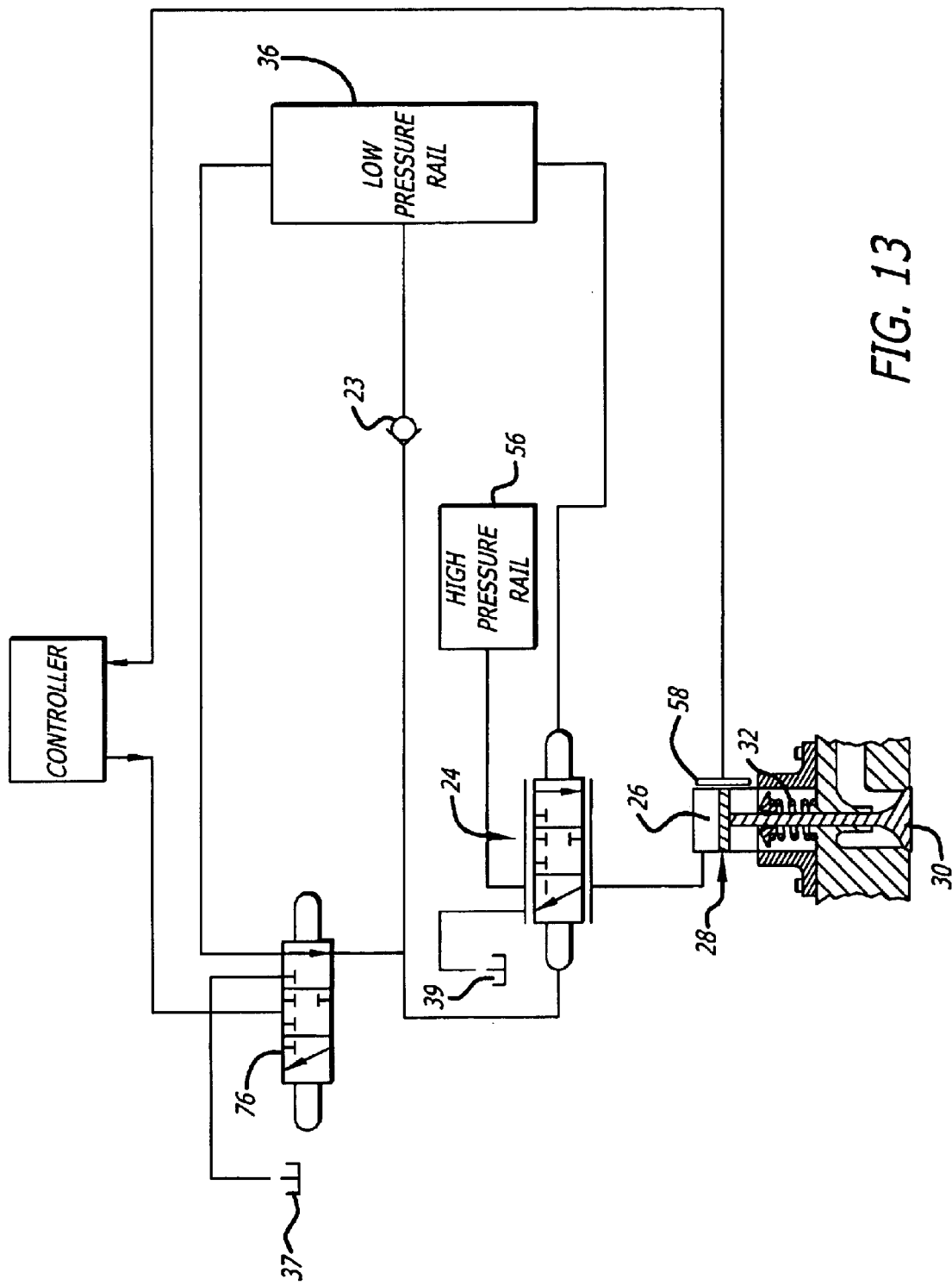
FIG. 13 is a diagram of still another alternative embodiment of the present invention similar to that shown in FIGS. 2, 11 or 12, but with the supply pilot valve and the vent pilot valve replaced with a single 3-way 3-position pilot valve.

In any of the configurations shown in FIGS. 2, 11 or 12 the supply pilot control valve 22 and the vent pilot control valve 20 can be alternatively replaced with a single 3-way 3-position pilot valve 76 as shown in FIG. 13. The 3 positions of this valve 76 are as follows:

Position 1: The control volume of the proportional valve 24 is connected to the low pressure rail 36.

Position 2: The control volume of the proportional valve is hydraulically locked.

Position 3: The control volume of the proportional valve 24 is connected to vent 37.

Figure 14:
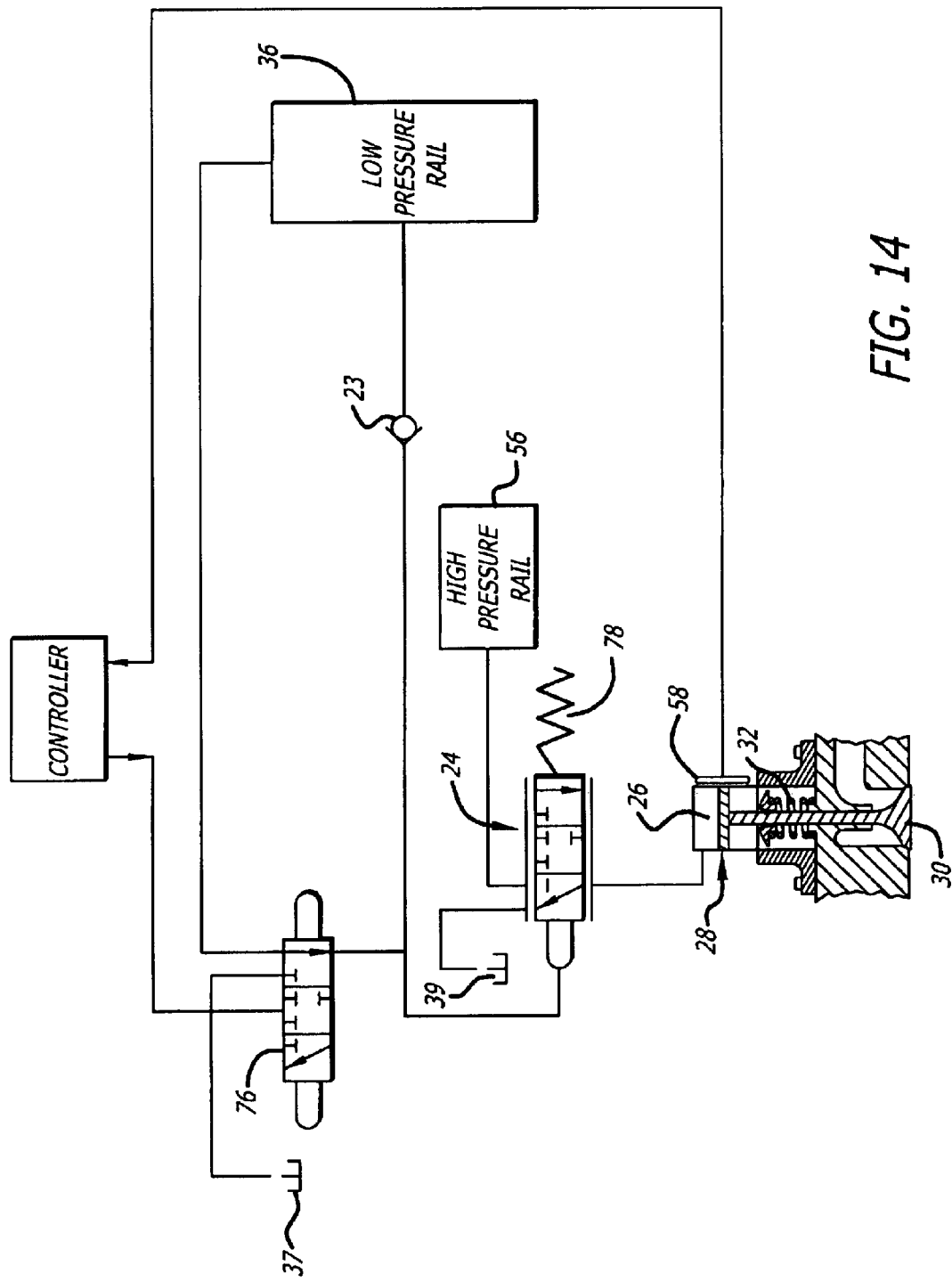
FIG. 14 shows the embodiment of FIG. 13 using a spring returned proportional valve.

In all the systems described, the proportional valve uses hydraulic force to oppose the pressure in its control volume. Alternatively, the proportional valve 24 can use a mechanical spring to provide this opposing force as shown in FIG. 14.

Also, all the systems used, schematically show a check valve 23 connecting the control volume of the proportional valve to the low pressure rail 36 used to actuate it. The check valve 23 may or may not be used. Its purpose is to damp out any fluid pressure spikes that may occur in the proportional valve control volume during operation. Alternatively, a check valve may be placed between the control volume of the engine valve actuator 28 and the high-pressure rail 56 in order to damp out any fluid pressure spikes that may occur during operation.

Any of the 3-way proportional valve systems may incorporate an energy recovery system, such as, for example, the recovery system using check valves as described by U.S. Pat. No. 5,275,136 issued to Schechter, et al. on Jan. 4, 1994 and U.S. Pat. No. 5,255,641 issued to Schechter on Oct. 26, 1993. The low-pressure rail used for actuating the 3 or 4 way proportional valve may be used for the low-pressure source of the recovery system if such a system is implemented.

Figure 15:
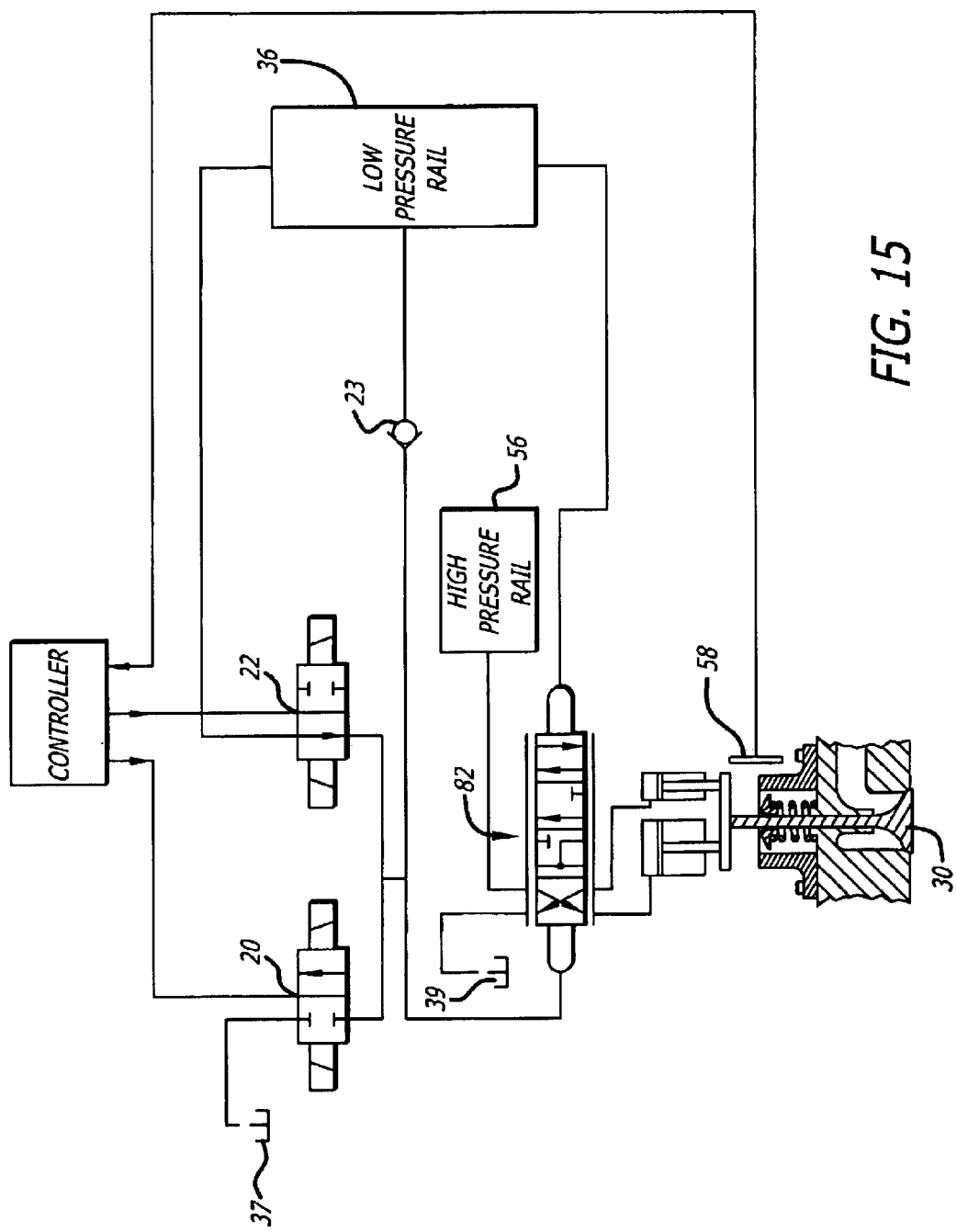
FIG. 15 illustrates a reconfiguration of the system for engine braking.

If engine braking is required in a vehicle, the exhaust valves of an engine using the present invention can be schematically reconfigured as shown in FIG. 15. (Triple concentric pistons may be used in a configuration similar to the dual configuration of FIG. 7 to provide a greater opening force for opening the exhaust valves at top dead center.) This configuration uses an infinitely variable 4-position 4 way proportional valve 82. It has the following states:

State 1 (leftmost position of FIG. 15): The high pressure fluid (about 100–240 bar or about 1450–3480 psi) is allowed to flow from the high pressure rail 56 to a control volume above the engine valve actuation piston (s) (Exemplary actuation pistons are shown in FIG. 7). The fluid in the control volume above the engine braking piston is vented to a relatively low pressure or atmospheric pressure.

State 2: The proportional valve 82 is positioned so that it traps fluid in the control volume above the engine valve actuation piston and creating a hydraulic lock.

The fluid in the control volume above the engine braking piston is vented to a relatively low pressure or atmospheric pressure.

State 3: The fluid in the control volume above the engine valve actuation piston(s) is vented to a relatively low pressure or atmospheric pressure. The fluid in the control volume above the engine braking piston is vented to a relatively low pressure or atmospheric pressure.

Engine Braking State (Rightmost Position of FIG. 15):

The fluid in the control volume above the engine valve actuation piston(s) is vented to a relatively low pressure or atmospheric pressure. The high pressure fluid about 100–240 bar or 1450–3480 psi is allowed to flow from the high pressure rail 56 to a control volume above the engine valve braking piston.

The way in which flow area into and out of the control volume above the engine valve actuation piston(s) changes with proportional valve position as defined in states 1, 2 and 3 may be the same as that shown in states 1, 2 and 3 of FIG. 3.

When operating the engine valve to "make power" (in a conventional combustion cycle), the 4 position 4 way proportional valve 82 moves between states 1, 2 and 3 as described for events one through six (FIG. 9). When the engine exhaust valves are to be operated in engine braking mode, the proportional valve 82 is moved between state 3 and the engine braking state. State 3 and the engine braking state of the proportional valve only allow for variable timing and duration of the relatively larger engine brake actuator. Lift of the exhaust in brake mode can be prescribed by a hard stop that limits the motion of the engine brake actuator. The engine brake actuator can be a large surface area (and is therefore may be larger in diameter than the boost actuator 60 of FIG. 7) exposed to the high pressure rail 56 during operation in order to supply a relatively large force to the engine valve. This relatively large force will be capable of opening the engine valve 30 when the fluid pressure in the combustion chamber is highest (e.g., at the end of a compression stroke).

Figure 17:
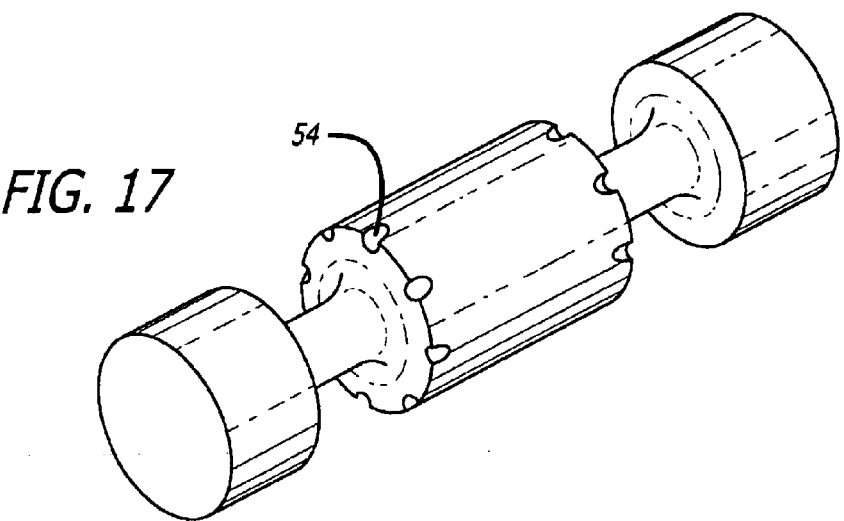
FIG. 17 is a perspective view of an alternate spool 38 of the embodiment of FIG. 2.

FIGS. 3 and 4 illustrate a way to shape the proportional valve spool to obtain the proportional valve flow area versus spool position as desired in the various exemplary embodiments previously set forth. However the proportional valve flow area versus spool position desired may be obtained in other ways also. By way of example, FIG. 17 is a perspective view of an alternate spool 38 of the embodiment of FIG. 2, and FIG. 19 is an enlarged view of an edge of the center land of the spool of FIG. 17. As may be seen in FIG. 17, the center land on the spool may have a plurality of kerfs 54 equally spaced around each end of the center land, which kerfs begin to open a controlled fluid flow area with spool position prior to the edge of the land on the spool reaching the edge of the land on the internal housing, the normal position for a spool valve flow area starting to be established.

Figure 18:
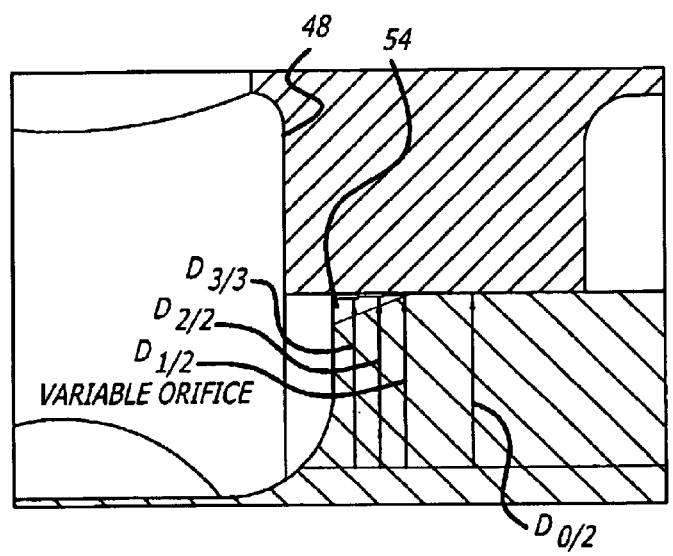
FIG. 18 is an enlarged view of an edge of the center land of a spool.

Alternatively or in addition, as may be seen in FIG. 18, small steps may be ground in the center land of the spool of the three-way proportional spool valve of the exemplary embodiment. Thus, while the spool has an outer diameter $D_0$ having a close sliding fit within the inner diameter of the internal housing, each end of the center land of the exemplary spool has additional diameters $D_1$, $D_2$ and $D_3$, where $D_3$ is less than $D_2$, $D_2$ is less than $D_1$ and $D_1$ is less than $D_0$. This provides a non-linear variation in flow area versus spool position during the opening and closing of the fluid communication between adjacent ports, as illustrated in FIGS. 5 and 6. Either the kerfs, the stepped diameters or both may be used.

The present invention has many advantages for both diesel and gasoline engines, as well as similar engines powered with alternate fuels. These advantages include:

Infinitely variable engine valve timing for both opening and closing times.

Infinitely variable engine valve lift from the engine valve seat to its maximum lift position.

Infinitely variable valve open and/or close time duration.

The proportional 3-way or 4 way valve has low gain flow regions for fine control at valve take-off and seating. It also has high gain flow regions for maximum flow allowing increased speed of the engine valve so that airflow into the engine cylinders can be maximized.

The system can allow the engine valve profile to be non-symmetric.

The system is capable of an infinitely varying the slew rate or velocity of the engine valve independent of rail pressure.

The system does not require a slow take-off and landing. Specifically, the valve can begin opening with maximum acceleration or seat at maximum velocity if desired.

The system does not need a lash adjustment system, specifically:

the system is unaffected and can compensate for the growth of engine components (specifically valve train components) due to thermal expansion, the system is unaffected and can compensate for engine valve recession due to wear of the valve seat and the engine valve, and the system is unaffected and can compensate for tolerance stack up between valve train components resulting from initial assembly and manufacturing tolerances.

The system can compensate for varying working fluid viscosity due to temperature, age, etc.

The system can optimize the amount and time at which air is metered into the engine combustion chamber thus optimizing the combustion event at the full spectrum of engine operating conditions resulting in:

maximum power, lower emissions, reduced emissions by controlling fuel/air mixing, reduced heat rejection by reduction of unnecessary in cylinder air motion, high BMEP combustion schemes to improve catalyst light-off, reduce startup emissions, and reduced pumping losses will minimize power consumption of the valve train.

The system can be operated in such a way that engine braking will result, specifically by shutting off the injector during braking and opening the exhaust valve at the top of the compression stroke to dissipate the compression energy.

The engine cycle can be varied to allow for:

2 stroke operation.

Multiple stroke operation (such as, by way of example 2-stroke to 4-stroke, 4-stroke to 6-stroke or 8-stroke operation, etc.) by eliminating one or more pairs of strokes from the normal engine operating cycle, with the valves being controlled during these pairs of strokes for minimum energy loss and/or other considerations.

The system can provide for internal exhaust gas recirculation (EGR). As a result a standard EGR valve is not needed.

Variable compression ratio.

Miller cycle operation—Maximum cylinder pressure control with high expansion ratio for maximum thermodynamic efficiency.

Atkinson cycle operation.

Improved Cranking and Cold Start.

Reduced white smoke and diesel "fuel" smell during startup/cold temperature idle/high altitude operation High altitude compensation.

Variable torque curves to better fit duty/drive cycle of vehicle.

Increased torque at low speeds for better driveability, potential vehicle fuel economy improvements.

The system will operate more efficiently with a sequentially apportioned pump.

The low-pressure rail can be replaced with an accumulator that is supplied by the return flow of the engine valve actuator.

Because the engine valve motion can be varied so that air can be throttled at the engine valve, the throttle body can be eliminated.

Operation of the turbo charge can be optimized at all engine operating conditions.

Cylinder deactivation for improved vehicle fuel economy.

Engine valve deactivation

Ability to open intake valves(s) with a profile or phasing that can improve swirl and tumble.

This 2-stage system has the capability of satisfactorily controlling engine valves at very high engine speeds (e.g., from idle-speeds to about 15,000 RPM). In addition, the critical regions of valve take-off and seating can be controlled with accuracy and precision while providing the features of infinitely variable valve timing, duration and lift. The system also has the capability of significantly increasing the amount of air that can be supplied to an engine's combustion chambers throughout the full range of engine speed by adjusting valve timing and duration to maximize the dynamic effects of flow into and out of the combustion chamber at all engine speeds.

While an exemplary embodiment and various alternate embodiments of the present invention have been disclosed herein, it will be obvious to those skilled in the art that various changes in form and detail may be made therein without departing from the spirit and scope of the invention.

What is claimed is:

1. Apparatus adapted for operating an engine valve, comprising:
   a hydraulic actuator operable to selectively move the engine valve toward an engine valve open position by the pressure of a fluid acting on the hydraulic actuator;
   a proportional valve having a valve member moveable between a first position at which the proportional valve is adapted to couple a source of fluid under a first pressure to the hydraulic actuator, a second position at which the proportional valve is adapted to couple the hydraulic actuator to a reservoir of fluid under a second pressure, the second pressure being less than the first pressure, and a third position at which the proportional valve blocks fluid communication between the hydraulic actuator and the source of fluid under the first pressure, and also blocks fluid communication between the hydraulic actuator and the reservoir of fluid under the second pressure;
   electrically controlled valving hydraulically controlling the position of the valve member; and,
   an engine valve return operable to return the engine valve to a closed position.

2. The apparatus of claim 1, wherein the third position is between the first position and the second position.

3. The apparatus of claim 2, wherein the proportional valve is configured to provide a variable fluid flow area adapted to couple the source of fluid to the hydraulic actuator wherein said fluid flow area changes nonlinearly with change in valve member position as the valve member moves from the first position to the third position.

4. The apparatus of claim 2, wherein the proportional valve is configured to provide a fluid flow area adapted to couple the hydraulic actuator to the reservoir of fluid wherein said fluid flow area changes nonlinearly with change in valve member position as the valve member moves from the second position to the third position.

5. The apparatus of claim 2, wherein the proportional valve is configured to provide a fluid flow area adapted to couple the source of fluid to the hydraulic actuator wherein said fluid flow area changes nonlinearly with change in valve member position as the valve member moves from the first position to the third position, and to provide a fluid flow area adapted to couple the hydraulic actuator to the reservoir of fluid wherein said fluid flow area changes nonlinearly with change in valve member position as the valve member moves from the second position to the third position.

6. The apparatus of claim 5, wherein the nonlinear change in fluid flow area with change in valve position comprises decreases in the rate of change of fluid flow areas with valve member position as the valve member proceeds toward the third position from both the first and the second positions.

7. The apparatus of claim 6, wherein the proportional valve is a spool valve, and the valve member is a spool.

8. The apparatus of claim 7, wherein the spool is configured to provide the nonlinear changes in fluid flow areas with change in valve member position.

9. The apparatus of claim 8, wherein the third position of the spool is approximately midway between the first and second positions.

10. The apparatus of claim 9, wherein the spool valve is adapted to block the source of fluid from the hydraulic actuator, and is also adapted to block fluid communication between the hydraulic actuator and the reservoir of fluid when the spool is approximately 40% to 60% of the way between the first and second positions.

11. The apparatus of claim 10, further comprising a second hydraulic actuator and wherein the spool is movable to a fourth position at which the proportional valve is adapted to couple the source of fluid to the second hydraulic actuator to move the engine valve toward the engine valve open position.

12. The apparatus of claim 1, wherein the engine valve return comprises a mechanical return spring.

13. The apparatus of claim 1, wherein the engine valve return comprises a hydraulic return.

14. The apparatus of claim 1, wherein the proportional valve is a closed center proportional valve.

15. The apparatus of claim 1, wherein the proportional valve is a 3-way closed center proportional valve.

16. The apparatus of claim 1, wherein the proportional valve is a closed center 4-way proportional valve.

17. The apparatus of claim 1, wherein the electrically controlled valving comprises two two-way valves.

18. The apparatus of claim 1, wherein the electrically controlled valving comprises a 3-way, 3-position valve.

19. The apparatus of claim 18, wherein the 3-way, 3-position, valve is a 3-way, 3 position pilot spool valve.

20. The apparatus of claim 11, wherein when the spool travels to the first, second or third position the proportional valve is adapted to couple the reservoir of fluid to the second hydraulic actuator.

21. The apparatus of claim 17, wherein the two two-way valves are two two-way spool valves.

22. The apparatus of claim 1 wherein the electrically controlled valving hydraulically controlling the position of the valve member comprises electrically controlled valving for controllably applying a first hydraulic force to move the valve member in one direction, and for controllably removing the first hydraulic force to allow a second hydraulic force that is less than the first hydraulic force to move the valve member in an opposite direction.

23. The apparatus of claim 1 wherein the electrically controlled valving hydraulically controlling the position of the valve member comprises electrically controlled valving for controllably applying a first hydraulic force to move the valve member in one direction, and for controllably removing the first hydraulic force to allow a return spring to move the valve member in an opposite direction.

24. The apparatus of claim 1, wherein the electrically controlled valving comprises two two-way, double solenoid spool valves.

25. The apparatus of claim 1, wherein the electrically controlled valving comprises two two-way, magnetically latchable spool valves.

26. The apparatus of claim 1, wherein the electrically controlled valving comprises a 3-way, 3-position, double solenoid valve.

27. The apparatus of claim 1, wherein the electrically controlled valving comprises a 3-way, 3-position, magnetically latchable valve.

28. Apparatus adapted for operating an engine valve, comprising:
 a hydraulic actuator operable to selectively move the engine valve toward an engine valve open position by the pressure of a fluid acting on the hydraulic actuator;
 a sensor adapted to sense the position of the engine valve;
 a proportional valve having a valve member moveable between a first position at which the proportional valve is adapted to couple a source of fluid under a first pressure to the hydraulic actuator, a second position at which the proportional valve is adapted to couple the hydraulic actuator to a reservoir of fluid under a second pressure, the second pressure being less than the first pressure, and a third position at which the proportional valve blocks fluid communication between the source of fluid under the first pressure and the hydraulic actuator, and also blocks fluid communication between the hydraulic actuator and the reservoir of fluid under the second pressure, the third position being between the first and second positions;
 electrically controlled valving hydraulically controlling the position of the valve member;
 an engine valve return operable to return the engine valve to a closed position; and,
 a controller coupled to the sensor and to the electrically controlled valving, the controller controlling the movement of the engine valve.

29. The apparatus of claim 28, wherein the proportional valve is configured to provide a variable fluid flow area adapted to couple the source of fluid to the hydraulic actuator wherein said fluid flow area changes nonlinearly with change in valve member position as the valve member moves from the first position to the third position.

30. The apparatus of claim 28, wherein the proportional valve is configured to provide a fluid flow area adapted to couple the hydraulic actuator to the reservoir of fluid wherein said fluid flow area changes nonlinearly with change in valve member position as the valve member moves from the second position to the third position.

31. The apparatus of claim 28, wherein the proportional valve is configured to provide a fluid flow area adapted to couple the source of fluid to the hydraulic actuator wherein said fluid flow area changes nonlinearly with change in valve member position as the valve member moves from the first position to the third position, and to provide a fluid flow area adapted to couple the hydraulic actuator to the reservoir of fluid wherein said fluid flow area changes nonlinearly with change in valve member position as the valve member moves from the second position to the third position.

32. The apparatus of claim 24, wherein the nonlinear change in fluid flow area with change in valve position comprise decreases in the rate of change of fluid flow areas with valve member position as the valve member proceeds toward the third position from either of the first and the second positions.

33. The apparatus of claim 32, wherein the proportional valve is a spool valve, and the valve member is a spool.

34. The apparatus of claim 33, wherein the spool is configured to provide the nonlinear changes in fluid flow areas with change in valve member position.

35. The apparatus of claim 34, wherein the third position of the spool is intermediate the first and second positions.

36. The apparatus of claim 35, wherein the spool valve is adapted to block fluid communication between the source of fluid and the hydraulic actuator, and is also adapted to block fluid communication between the hydraulic actuator and the reservoir when the spool is approximately 40% to 60% of the way between the first and second positions.

37. The apparatus of claim 28, further comprising a second hydraulic actuator and wherein the spool is movable to a fourth position at which the proportional valve is adapted to couple the source of fluid to the second hydraulic actuator to move the engine valve toward the engine valve open position.

38. The apparatus of claim 28, wherein the engine valve return comprises a mechanical return spring.

39. The apparatus of claim 28, wherein the engine valve return comprises a hydraulic return.

40. The apparatus of claim 28, wherein the proportional valve is a closed center proportional valve.

41. The apparatus of claim 28, wherein the proportional valve is a 3-way closed center proportional valve.

42. The apparatus of claim 28, wherein the proportional valve is a closed center 4-way proportional valve.

43. The apparatus of claim 28, wherein the electrically controlled valving comprises a pair of two-way valves.

44. The apparatus of claim 28, wherein the electrically controlled valving comprises a 3-way, 3-position valve.

45. The apparatus of claim 44, wherein the 3-way, 3-position valve is a 3-way, 3-position pilot spool valve.

46. The apparatus of claim 37, wherein when the spool travels to the first, second or third position the proportional valve is adapted to couple the reservoir of fluid to the second hydraulic actuator.

47. The apparatus of claim 43, wherein the two two-way valves are two two-way spool valves.

48. The apparatus of claim 28 wherein the electrically controlled valving hydraulically controlling the position of the valve member comprises electrically controlled valving for controllably applying a first hydraulic force to move the valve member in one direction, and for controllably removing the first hydraulic force to allow a second hydraulic force that is less than the first hydraulic force to move the valve member in an opposite direction.

49. The apparatus of claim 28 wherein the electrically controlled valving hydraulically controlling the position of the valve member comprises electrically controlled valving for controllably applying a first hydraulic force to move the valve member in one direction, and for controllably removing the first hydraulic force to allow a return spring to move the valve member in an opposite direction.

50. The apparatus of claim 28, wherein the electrically controlled valving comprises a pair of two-way, double solenoid valves.

51. The apparatus of claim 28, wherein the electrically controlled valving comprises a pair of two-way, magnetically latchable valves.

52. The apparatus of claim 28, wherein the electrically controlled valving comprises a 3-way, 3-position, double solenoid valve.

53. The apparatus of claim 28, wherein the electrically controlled valving comprises a 3-way, 3-position, magnetically latchable valve.

54. A method of operating an engine valve, comprising:
providing a hydraulic actuator disposed with respect to the engine valve to encourage the engine valve toward an engine valve open position by the pressure of a fluid acting on the hydraulic actuator;
coupling the hydraulic actuator to a proportional valve having a valve member moveable between a first position at which the proportional valve couples a source of fluid under a first pressure to the hydraulic actuator, a second position at which the proportional valve couples the hydraulic actuator to a reservoir of fluid under a second pressure, the second pressure being less than the first pressure, and a third position at which the proportional valve blocks fluid communication between the hydraulic actuator and the source of fluid under the first pressure, and also blocks fluid communication between the hydraulic actuator and the reservoir of fluid under the second pressure; and,
hydraulically controlling the position of the valve member by electrically controlled valving.

55. The method of claim 54 wherein the valve member moves between the first and second positions through the third position, and wherein hydraulically controlling the position of the valve member includes stopping the valve member at the third position to hydraulically hold the engine valve at an engine valve open.

56. The method of claim 55 wherein the engine valve is an engine exhaust valve, and further comprising providing a second hydraulic actuator disposed with respect to the engine valve to encourage the engine valve toward an engine valve open position by the pressure of a fluid acting on the hydraulic actuator, the valve member having a fourth position coupling the source of fluid under the first pressure to the second actuator; and,
moving the valve member to the fourth position at the end of a compression stroke to provide engine braking.

57. The method of claim 56, wherein when the valve member is in the first, second and third positions, the proportional valve is adapted to couple the reservoir of fluid to the second hydraulic actuator.

58. The method of claim 55 wherein the proportional valve is configured to provide a nonlinear fluid flow area versus valve member position as the valve member moves from the third position toward either the first or the second position, the fluid flow area change versus valve member position change increasing as the valve member approaches the first and the second positions.

59. The method of claim 58 wherein the position of the valve member is hydraulically controlled to control at least one engine valve parameter selected from the group of engine valve takeoff velocity, engine valve landing velocity, engine valve opening velocity, engine valve closing velocity, engine valve lift, timing of engine valve lift, and duration of engine valve lift.

60. The method of claim 59 wherein the position of the valve member versus crankshaft angle is hydraulically controlled responsive to at least one parameter selected from the group consisting of engine operating speed, engine load, fuel temperature, air temperature, engine oil temperature, atmospheric pressure, and the pressure of the low pressure rail and the high pressure rail.

61. The method of claim 54 wherein hydraulically controlling the position of the valve member by electrically controlled valving comprises controllably applying a first hydraulic force to move the valve member in one direction, and removing the first hydraulic force to allow a second hydraulic force that is less than the first hydraulic force move the valve in an opposite direction.

62. The method of claim 54 wherein hydraulically controlling the position of the valve member by electrically controlled valving comprises controllably applying a first hydraulic force to move the valve member in one direction, and removing the first hydraulic force to allow a return spring move the valve member in an opposite direction.

63. The method of claim 58 wherein the position of the valve member is hydraulically controlled to control engine valve takeoff velocity, engine valve landing velocity, engine valve opening velocity, engine valve closing velocity engine valve lift, timing of engine valve lift, and duration of engine valve lift.

64. The method of claim 58 wherein the position of the valve member is hydraulically infinitely controllable to control engine valve takeoff velocity, engine valve landing velocity, engine valve opening velocity, engine valve closing velocity, engine valve lift, timing of engine valve lift, and duration of engine valve lift.

65. The method of claim 58 wherein the position of the valve member is hydraulically controlled to control engine valve takeoff velocity and engine valve landing velocity.

66. Apparatus adapted for operating an engine valve, comprising:
a hydraulic actuator adapted to cooperate with an engine valve and operable to selectively move an engine valve toward an engine valve open position by the pressure of a fluid acting on the hydraulic actuator;
a sensor adapted to determine the position of the engine valve;
a proportional valve having a valve member moveable between a first position at which the proportional valve is adapted to couple a source of fluid under a first pressure to the hydraulic actuator and block fluid communication between the hydraulic actuator and a reservoir of fluid under a second pressure, a second position at which the proportional valve is adapted to couple the hydraulic actuator to the reservoir of fluid under a the second pressure, the second pressure being less than the first pressure and block fluid communication between the hydraulic actuator and the source of fluid under the first pressure, and a third position between the first and second positions at which the proportional valve is adapted to block fluid communication between the source of fluid under a first pressure and the hydraulic actuator and to block fluid communication between the hydraulic actuator and the reservoir of fluid under the second pressure;
the proportional valve being configured to provide a fluid flow area adapted to couple the source of fluid to the hydraulic actuator wherein said fluid flow area changes nonlinearly with change in valve member position as the valve member moves from the first position to the third position, and to provide a fluid flow area adapted to couple the hydraulic actuator to the reservoir of fluid wherein said fluid flow area changes nonlinearly with change in valve member position as the valve member moves from the second position to the third position, the nonlinear change in fluid flow area with change in valve position having a decrease in the rate of change of fluid flow area with valve member position as the valve member proceeds toward the third position from both the first and the second positions;

electrically controlled valving hydraulically controlling the position of the valve member; and, a controller coupled to the sensor and to the electrically controlled valving, the controller controlling the movement of the engine valve.

67. The apparatus of claim 66, wherein the proportional valve is a spool valve, and the valve member is a spool.

68. The apparatus of claim 66 wherein the electrically controlled valving hydraulically controlling the position of the valve member comprises electrically controlled valving for controllably applying a first hydraulic force to move the valve member in one direction, and for controllably removing the first hydraulic force to allow a second hydraulic force that is less than the first hydraulic force to move the valve member in an opposite direction.

69. The apparatus of claim 66 wherein the electrically controlled valving hydraulically controlling the position of the valve member comprises electrically controlled valving for controllably applying a first hydraulic force to move the valve member in one direction, and for controllably removing the first hydraulic force to allow a return spring to move the valve member in an opposite direction.

70. Apparatus adapted for operating an engine valve, comprising:

a first hydraulic actuator operable to selectively move the engine valve toward an engine valve open position by the pressure of a fluid acting on the first hydraulic actuator;

a second hydraulic actuator operable to selectively move the engine valve toward an engine valve open position by the pressure of a fluid acting on the second hydraulic actuator;

a proportional valve having a valve member moveable between a first position at which the proportional valve is adapted to couple a source of fluid under a first pressure to the first hydraulic actuator, a second position at which the proportional valve is adapted to couple the first hydraulic actuator to a reservoir of fluid under a second pressure, and a third position between the first and second positions at which the proportional valve blocks fluid communication between the first hydraulic actuator and the source of fluid under the first pressure and also blocks fluid communication between the first hydraulic actuator and the reservoir of fluid under the second pressure, the second pressure being less than the first pressure;

the valve member also being movable to a fourth position at which the proportional valve is adapted to couple the source of fluid to the second hydraulic actuator to move the engine valve toward the engine valve open position, the proportional valve coupling the reservoir of fluid to the second hydraulic actuator when the valve member is in the first, second or third position;

electrically controlled valving hydraulically controlling the position of the valve member between the first through fourth positions; and, an engine valve return operable to return the engine valve to a closed position.

71. The apparatus of claim 70, wherein the proportional valve is configured to provide a variable fluid flow area adapted to couple the source of fluid to the hydraulic actuator wherein said fluid flow area changes nonlinearly with change in valve member position as the valve member moves from the first position to the third position.

72. The apparatus of claim 70, wherein the proportional valve is configured to provide a fluid flow area adapted to couple the hydraulic actuator to the reservoir of fluid wherein said fluid flow area changes nonlinearly with change in valve member position as the valve member moves from the second position to the third position.

73. The apparatus of claim 70, wherein the proportional valve is configured to provide a fluid flow area adapted to couple the source of fluid to the hydraulic actuator wherein said fluid flow area changes nonlinearly with change in valve member position as the valve member moves from the first position to the third position, and to provide a fluid flow area adapted to couple the hydraulic actuator to the reservoir of fluid wherein said fluid flow area changes nonlinearly with change in valve member position as the valve member moves from the second position to the third position.

74. The apparatus of claim 73, wherein the nonlinear change in fluid flow area with change in valve position comprises decreases in the rate of change of fluid flow areas with valve member position as the valve member proceeds toward the third position from both the first and the second positions.

75. The apparatus of claim 74, wherein the proportional valve is a spool valve, and the valve member is a spool.

76. The apparatus of claim 75, wherein the spool is configured to provide the nonlinear changes in fluid flow areas with change in valve member position between the first, second and third valve member positions.

77. The apparatus of claim 76, wherein the third position of the spool is intermediate the first and second positions.

78. The apparatus of claim 77, wherein the spool valve is adapted to block the source of fluid from the hydraulic actuator, and is also adapted to block fluid communication between the hydraulic actuator and the reservoir of fluid when the spool is approximately 40% to 60% of the way between the first and second positions.

79. The apparatus of claim 70, wherein the engine valve return comprises a mechanical return spring.

80. The apparatus of claim 70, wherein the electrically controlled valving comprises two two-way spool valves.

81. The apparatus of claim 70 further comprised of:

a sensor adapted to sense the position of the engine valve; and, a controller coupled to the sensor and to the electrically controlled valving, the controller controlling the movement of the engine valve.

82. The apparatus of claim 70 wherein the electrically controlled valving hydraulically controlling the position of the valve member comprises electrically controlled valving for controllably applying a first hydraulic force to move the valve member in one direction, and for controllably removing the first hydraulic force to allow a second hydraulic force that is less than the first hydraulic force to move the valve member in an opposite direction.

83. The apparatus of claim 70 wherein the electrically controlled valving hydraulically controlling the position of the valve member comprises electrically controlled valving for controllably applying a first hydraulic force to move the valve member in one direction, and for controllably removing the first hydraulic force to allow a return spring to move the valve member in an opposite direction.

84. The apparatus of claim 70, wherein the electrically controlled valving comprises two two-way, double solenoid spool valves.

85. The apparatus of claim 70, wherein the electrically controlled valving comprises two two-way, magnetically latchable spool valves.

86. A method of operating an engine valve, comprising:

providing a hydraulic actuator disposed with respect to the engine valve to encourage the engine valve toward an engine valve open position by the pressure of a fluid actin on the hydraulic actuator;

coupling the hydraulic actuator to a proportional valve having a valve member moveable between a first position at which the proportional valve couples a source of fluid under a first pressure to the hydraulic actuator, a second position at which the proportional valve couples the hydraulic actuator to a reservoir of fluid under a second pressure, the second pressure being less than the first pressure, and a third position at which the proportional valve blocks fluid communication between the hydraulic actuator and the source of fluid under the first pressure, and also blocks fluid communication between the hydraulic actuator and the reservoir of fluid under the second pressure; and, hydraulically controlling the position of the valve member by electrically controlled valving, the valve member position being controlled to control the fluid flow rate from the source of fluid under the first pressure to the hydraulic actuator to control engine valve takeoff velocity and engine valve opening velocity, to block fluid communication between the hydraulic actuator and the reservoir of fluid under the second pressure to control engine valve lift, and to control fluid flow from the hydraulic actuator to the reservoir of fluid under the second pressure to control engine valve closing velocity and engine valve landing velocity, the foregoing being controlled to control timing of engine valve lift and duration of engine valve lift.

87. The method of claim 86 wherein the third position is between the first and second positions.

88. The method of claim 87 wherein the engine valve takeoff velocity and engine valve opening velocity are controlled by controlling the position of the valve member between the first position and the second position, engine valve lift is controlled by moving the valve member to the third position, and engine valve closing velocity and engine valve landing velocity by controlling the position of the valve member between the third position and the second position.

89. The method of claim 88 wherein the fluid flow rates are nonlinear with respect to valve member position, the fluid flow rates increasing per unit of valve member position as the valve member approaches the first and second positions.

90. The method of claim 89 wherein the valve member position is infinitely variable between the first and second positions.

* * * * *